United States Patent
Matsumura et al.

(10) Patent No.: US 11,197,277 B2
(45) Date of Patent: Dec. 7, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 90 days.

(21) Appl. No.: 16/609,434

(22) PCT Filed: May 2, 2017

(86) PCT No.: PCT/JP2017/017306
§ 371 (c)(1),
(2) Date: Oct. 29, 2019

(87) PCT Pub. No.: WO2018/203407
PCT Pub. Date: Nov. 8, 2018

(65) Prior Publication Data
US 2020/0059924 A1   Feb. 20, 2020

(51) Int. Cl.
| | |
|---|---|
| *H04L 1/18* | (2006.01) |
| *H04L 5/00* | (2006.01) |
| *H04L 1/00* | (2006.01) |
| *H04W 72/04* | (2009.01) |
| *H04L 27/26* | (2006.01) |

(52) U.S. Cl.
CPC ....... *H04W 72/0413* (2013.01); *H04L 1/0026* (2013.01); *H04L 1/1819* (2013.01); *H04L 5/0055* (2013.01); *H04L 27/2607* (2013.01)

(58) Field of Classification Search
CPC .......... H03F 3/19; H04F 3/245; H04W 88/02; H04W 72/0413; H04L 27/2607; H04L 1/0026; H04L 5/0055
See application file for complete search history.

(56) References Cited

U.S. PATENT DOCUMENTS

| | | | |
|---|---|---|---|
| 2017/0041923 A1* | 2/2017 | Park | H04L 5/0053 |
| 2018/0124815 A1* | 5/2018 | Papasakellariou | H04L 1/1861 |
| 2019/0036746 A1* | 1/2019 | Hwang | H04L 27/3444 |
| 2019/0379567 A1* | 12/2019 | Kuchi | H04L 5/0007 |

(Continued)

OTHER PUBLICATIONS

Intel Corporation UL control channel design with long duration; R1-1611995 Nov. 2016 (Year: 2016).*

(Continued)

*Primary Examiner* — Charles C Jiang
*Assistant Examiner* — Voster Preval
(74) *Attorney, Agent, or Firm* — Osha Bergman Watanabe & Burton LLP

(57) ABSTRACT

A terminal is disclosed including a transmitter and a processor. The transmitter transmits uplink control information in an uplink control channel. The processor uses either a first uplink control channel format using a cyclic shift that depends on the uplink control information or a second uplink control channel format not using the cyclic shift that depends on the uplink control information, to transmit the uplink control information, based on a number of bits of the uplink control information and a type of the uplink control information. In other aspects, a radio communication method for a terminal is also disclosed.

11 Claims, 20 Drawing Sheets

(56) References Cited

U.S. PATENT DOCUMENTS

2020/0092876 A1\* 3/2020 Cho ................ H04W 72/0413
2020/0112467 A1\* 4/2020 Shen ........................ H04L 5/10

OTHER PUBLICATIONS

Motorola resource allocation for short PUCCH; R1 1705554 (Year: 2017).\*
Office Action issued in Korean Application No. 10-2019-7034379; dated Feb. 17, 2021 (10 pages).
Office Action issued in the counterpart Japanese Patent Application No. 2019-516343, dated Apr. 2, 2020 (8 pages).
NTT Docomo, Inc.; "Sequence-based PUCCH vs DMRS-based PUCCH"; 3GPP TSG Ran WG1 Meeting #88bis, R1-1705739; Spokane, USA; Apr. 3-7, 2017 (11 pages).
ZTE, ZTE Microelectronics.; "sPUCCH resource management"; 3GPP TSG Ran WG1 Meeting #88bis, R1-1704643 Spokane, USA; Apr. 3-7, 2017 (10 pages).
International Search Report issued in PCT/JP2017/017306 dated Jul. 25, 2017 (1 page).
Written Opinion of the International Searching Authority issued in PCT/JP2017/017306 dated Jul. 25, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
3GPP TS 36.211 V8.9.0; "3rd Generation Partnership Project; Technical Specification Group Radio Access Network Evolved Universal Terrestrial Radio Access (E-UTRA); Physical Channels and Modulation (Release 8)"; Dec. 2009 (83 pages).
Office Action issued in Chilean Application No. 201903156; dated Dec. 14, 2020 (19 pages).
Extended European Search Report issued in counterpart European Patent Application No. 17908549.3, dated Nov. 19, 2020 (8 pages).
NTT Docomo, Inc.; "Views on sPUCCH design"; 3GPP TSG Ran WG1 Meeting #88, R1-1702784; Athens, Greece Feb. 13-17, 2017 (7 pages).
NTT Docomo, Inc.; "DMRS-based vs. Sequence-based PUCCH in short duration"; 3GPP TSG Ran WG1 Meeting #88, R1-1702811; Athens, Greece; Feb. 13-17, 2017 (9 pages).
NTT Docomo, Inc.; "PUCCH in short duration"; 3GPP TSG Ran WG1 Meeting #88bis, R1-1705740; Spokane, USA; Apr. 3-7, 2017 (8 pages).
Motorola Mobility, Lenovo; "Resource allocation for short PUCCH"; 3GPP TSG Ran WG1 Meeting #88bis, R1-1705554; Spokane, USA; Apr. 3-7, 2017 (4 pages).
Office Action in counterpart European Patent Application No. 17 908 549.3 dated Jun. 22, 2021 (8 pages).

\* cited by examiner

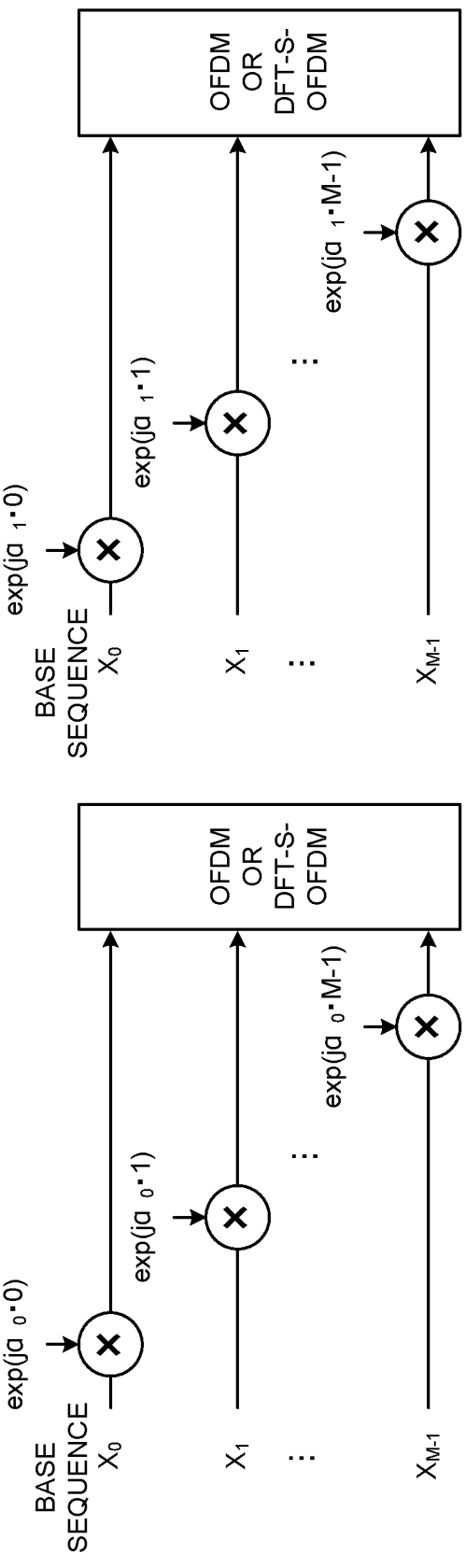
FIG. 3A
FIG. 3B
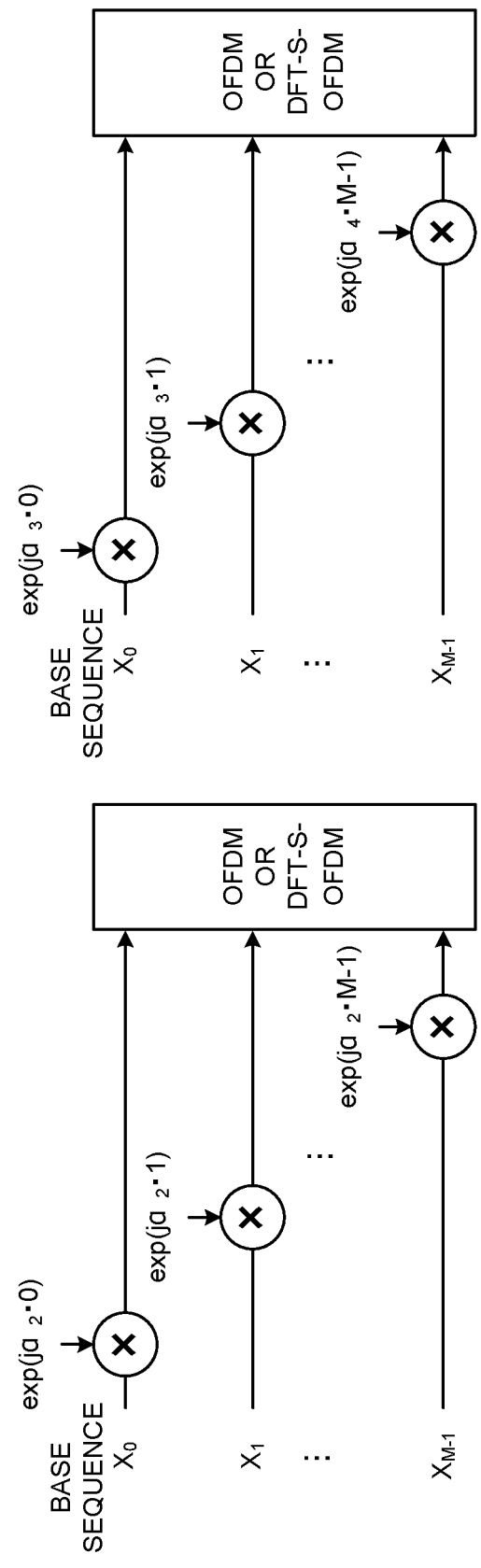
FIG. 3C
FIG. 3D

FIRST SYMBOL IN DMRS-BASED TRANSMISSION

SECOND SYMBOL IN DMRS-BASED TRANSMISSION

FIRST SYMBOL IN SEQUENCE-BASED TRANSMISSION

SECOND SYMBOL IN SEQUENCE-BASED TRANSMISSION

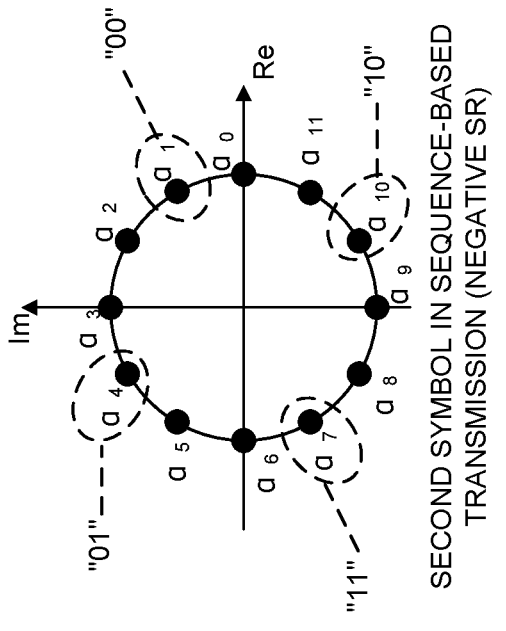
FIG. 9A
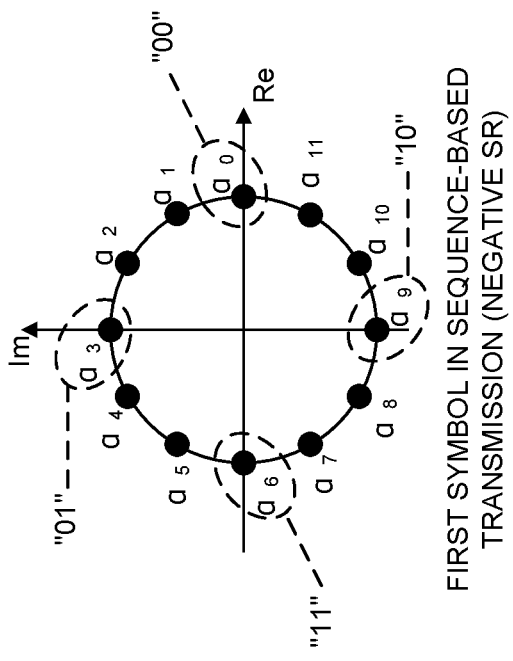
FIG. 9B
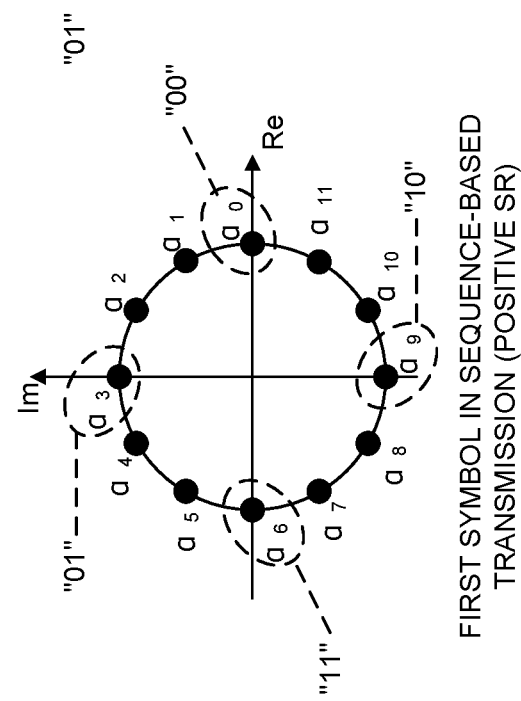
FIG. 9C
FIG. 9D

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+(plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). This subframe is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using a UL control channel (for example, PUCCH (Physical Uplink Control CHannel)) and/or a UL data channel (for example, PUSCH (Physical Uplink Shared CHannel)). The format of this UL control channel is referred to as "PUCCH format" and so on.

UCI includes at least one of a scheduling request (SR), retransmission control information in response to DL data (DL data channel (PDSCH (Physical Downlink Shared Channel))) (also referred to as "HARQ-ACK (Hybrid Automatic Repeat reQuest-ACKnowledgement)," "ACK," "NACK (Negative ACK)," and so on), and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Furthermore, in LTE/NR, studies are underway to use UL control channels of various formats (UL control channel formats). When applying UCI transmission methods in existing LTE systems (LTE Rel. 13 or earlier versions) to such future radio communication systems, there is a risk that the coverage, throughput and/or others may deteriorate.

The present invention has been made in view of the above, and it is therefore an object of the present invention to provide a user terminal and a radio communication method, whereby UL control information can be reported properly in future radio communication systems.

Solution to Problem

According to one aspect of the present invention, a user terminal has a control section that controls code division multiplexing of a reference signal for demodulating first UL control information and a signal sequence, which uses a sequence that is associated with a value of second UL control information, and a transmission section that transmits a UL signal subject to the code division multiplexing, and the control section controls mapping of a plurality of signal sequences to different frequency resources in different time resources.

Advantageous Effects of Invention

According to the present invention, UL control information can be reported properly in future radio communication systems.

BRIEF DESCRIPTION OF DRAWINGS

FIGS. 3A to 3D are diagrams, each showing an example of a transmission signal generation process in sequence-based transmission;

FIGS. 9A to 9D are diagrams, each showing an example of a cyclic shift hopping pattern for reporting whether an SR is positive or negative in sequence-based transmission;

DESCRIPTION OF EMBODIMENTS

Figure 1A:
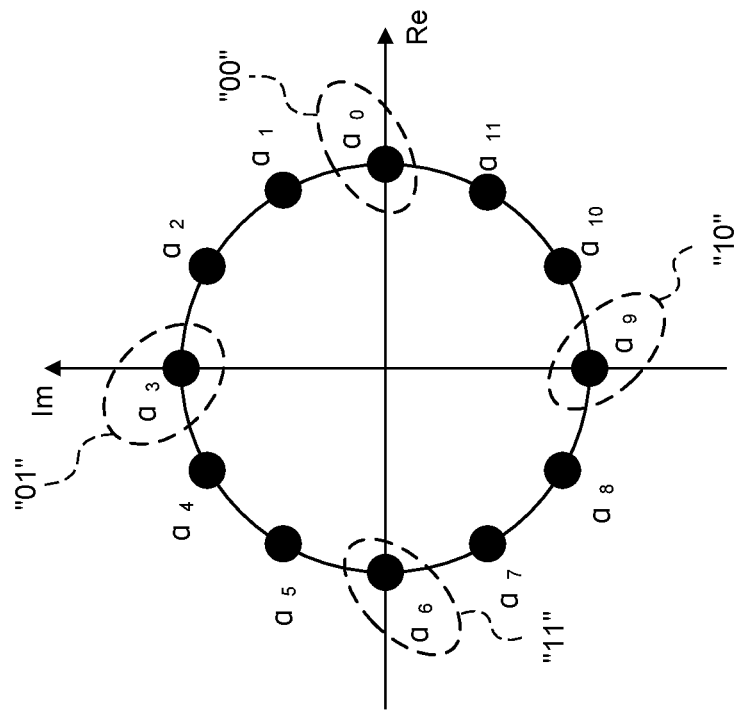
FIGS. 1A and 1B are diagrams, each showing an example of a set of amounts of phase rotation for use in sequence-based transmission.

Future radio communication systems (for example, LTE Rel. 14, 15 and/or later versions, 5G, NR, etc.) are under study to introduce multiple numerologies, not a single numerology.

Note that a numerology may refer to a set of communication parameters that characterize the design of signals in a given RAT (Radio Access Technology), the design of a RAT, and so forth, or may refer to parameters that relate to the frequency direction and/or the time direction, such as subcarrier spacing (SCS), the duration of symbols, the duration of cyclic prefixes, the duration of subframes, and so on.

Also, envisaging future radio communication systems, research is in progress to introduce time units (also referred to as "subframes," "slots," "minislots," "subslots," "transmission time intervals (TTIs)," "short TTIs (sTTIs)" "radio frames" and so on) that are the same as and/or different from those of existing LTE systems (LTE Rel. 13 or earlier versions), while supporting multiple numerologies and so on.

Note that a TTI may represent the unit of it takes to transmit and receive a transport block, a code block and/or a codeword of transmitting/receiving data. Given a TTI, the period of time (the number of symbols) in which a transport block, a code block and/or a codeword of data is actually mapped may be shorter than the TTI.

For example, when a given number of symbols (for example, fourteen symbols) constitute a TTI, transmitting/receiving data's transport block, code block and/or codeword can be transmitted and received in a period of one or a given number of symbols in these constituent symbols. If the number of symbols where the transport block, code block and/or codeword of transmitting/receiving data is transmitted and/or received is smaller than the number of symbols constituting a TTI, reference signals, control signals and/or other signals can be mapped to the symbols in the TTI where no data is mapped.

Subframes may serve as time units having a given time duration (for example, one ms), irrespective of which numerology is used by (and/or configured in) a user terminal (hereinafter also referred to as, for example, "UE (User Equipment)").

By contrast with this, slots may serve as time units that depend on the numerology the UE uses. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may contain a plurality of minislots (sub slots).

For such future radio communication systems, studies are underway to support a UL control channel (hereinafter also referred to as a "short PUCCH") that is structured to be shorter in duration than PUCCH (Physical Uplink Control CHannel) formats used in existing LTE systems (for example, LTE Rel. 8 to 13) and/or a UL control channel (hereinafter also referred to as a "long PUCCH") that is structured to have a longer duration than the above short duration.

A short PUCCH (also referred to as a "shortened PUCCH") is formed with a given number of symbols (for example, two or three symbols) provided at a given SCS. In this short PUCCH, uplink control information (UCI) and reference signals (RSs) may be time-division-multiplexed (TDM) or frequency-division-multiplexed (FDM). The RSs may be, for example, the demodulation reference signal (DMRS) for use for demodulating UCI.

The SCS of symbols in the short PUCCH may be the same as or higher than the SCS of symbols of data channels (hereinafter also referred to as "data symbols"). The data channels may include, for example, a downlink data channel (PDSCH (Physical Downlink Shared Channel)), an uplink data channel (PUSCH (Physical Uplink Shared CHannel)) and so on.

Hereinafter, whenever "PUCCH" is simply mentioned, this may be read as a "short PUCCH."

A PUCCH may be time-division-multiplexed (TDM) and/or frequency-division-multiplexed (FDM) with a UL data channel (hereinafter also referred to as a "PUSCH") in a slot. Also, a PUCCH may be time-division-multiplexed (TDM) and/or frequency-division-multiplexed (FDM) with a DL data channel (hereinafter also referred to as a "PDSCH") and/or a DL control channel (hereinafter also referred to as a "PDCCH (Physical Downlink Control CHannel)") in a slot.

Short PUCCH transmission schemes that are under research include DMRS-based transmission (also referred to as a "DMRS-based PUCCH"), whereby UCI is reported by transmitting UL signals in which DMRS and UCI are time-division-multiplexed (TDM), and sequence-based transmission (also referred to as a "sequence-based PUCCH"), whereby UCI is reported by transmitting UL signals which use code resources that are associated with UCI values, without using DMRS.

In DMRS-based transmission, a PUCCH to contain an RS for demodulating UCI is transmitted, and therefore may be referred to as "coherent transmission," "coherent design," and so on. In sequence-based transmission, UCI is reported by using a PUCCH that contains no RS for demodulating the UCI, and therefore may be referred to as "non-coherent transmission," "non-coherent design" and so on.

In sequence-based transmission, UL signals are transmitted using code resources that are associated with UCI values respectively. The code resources are resource that can be code-division-multiplexed (Code Division Multiplexing (CDM)), and may be at least one of base sequences, cyclic shifts (amounts of phase rotation) and OCCs (Orthogonal Cover Codes).

Information related to code resources may be reported from a NW (network, which is, for example, a radio base station) to UEs through higher layer signaling (for example, RRC (Radio Resource Control) signaling, MAC (Medium Access Control) signaling, broadcast information (the MIB (Master Information Block), SIBs (System Information Blocks), etc.) or physical layer signaling (for example, DCI), or by combining these.

The base sequences may be CAZAC (Constant Amplitude Zero Auto-Correlation) sequences (for example, Zadoff-Chu sequences), or may be sequences that are equivalent to CAZAC sequences (for example, CG-CAZAC (Computer-Generated CAZAC) sequences), such as ones specified in 3GPP TS 36.211 § 5.5.1.2 (in particular, table 5.5.1.2-1 and table 5.5.1.2-2).

Now, a case will be described below where, in sequence-based transmission, two-bit UCI is transmitted by using cyclic shifts. A number of candidate amounts of phase rotation that are assigned to one UE may be hereinafter referred to as a "set of amounts of phase rotation," a "set of phase rotation amounts," a "phase rotation amount set," and so forth.

Figure 1B:
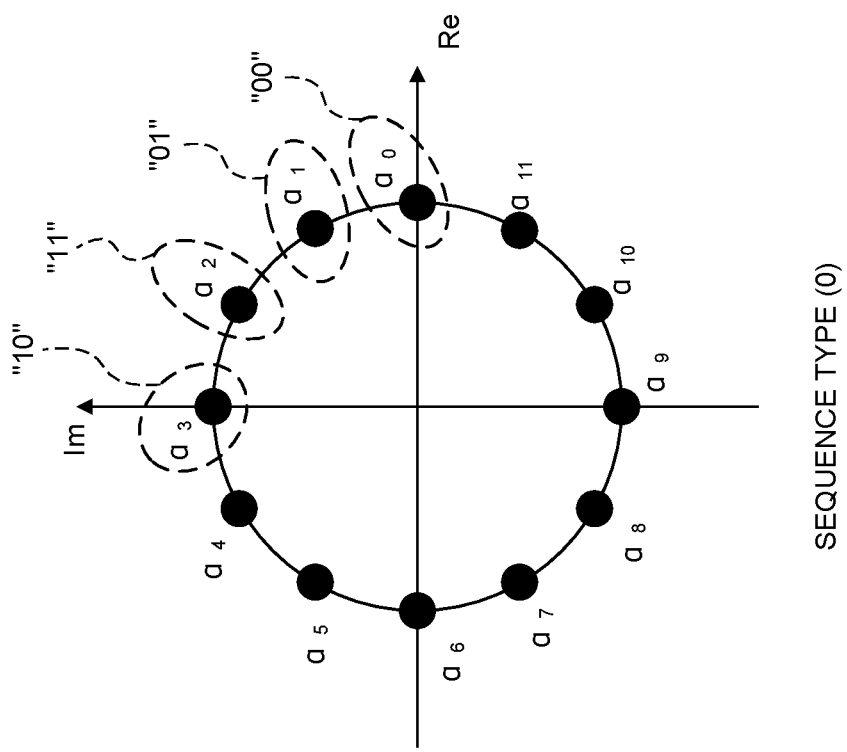

The sequence length of a base sequence is determined by the number of subcarriers M and the number of PRBs (Physical Resource Blocks). When sequence-based transmission is performed using a band consisting of one PRB unit, the sequence length of the base sequence is twelve (=12×1). In this case, as shown in FIGS. 1A and 1B, twelve amounts of phase rotation $\alpha_0$ to $\alpha_{11}$, provided at phase intervals of $2\pi/12$ (that is, $\pi/6$), are defined. By rotating (cyclically shifting) the phase of one base sequence based on the amounts of phase rotation $\alpha_0$ to $\alpha_{11}$, on a one-by-one basis, twelve sequences that are orthogonal to each other (with zero cross-correlation) are acquired. Note that the amounts of phase rotation $\alpha_0$ to $\alpha_{11}$ have only to be determined based on at least one of the number of subcarriers M, the number of PRBs and the sequence length of the base sequence. The CS candidate set here may consist of two or more amounts of phase rotation that are selected from these amounts of phase rotation $\alpha_0$ to $\alpha_{11}$.

The phase rotation amount set for use for sequence type (0) shown in FIG. 1A is comprised of a number of neighboring (continuous) amounts of phase rotation. This phase rotation amount set includes four amounts of phase rotation $\alpha_0$, $\alpha_1$, $\alpha_2$ and $\alpha_3$, each spaced apart by $\pi/6$. The phase rotation amount set for use for sequence type (1) shown in FIG. 1B is comprised of a number of amounts of phase rotation that are mutually spaced apart. In this phase rotation amount set, the gap between two neighboring amounts of phase rotation is the greatest, and four amounts of phase rotation $\alpha_0$, $\alpha_3$, $\alpha_6$ and $\alpha_9$, each spaced apart by $\pi/2$, are included.

In an environment that is little frequency-selective, both sequence type (0) and sequence type (1) produce little cross-correlation (that is to say, sequences generated from each sequence type do not interfere with each other). Therefore, in an environment that is little frequency-selective, sequence type (0) and sequence type (1) have an equal UCI error rate. When sequence type (0) is used, twelve amounts of phase rotation can be provided more densely, so that three UEs each can use four amounts of phase rotation, allowing more efficient use of amounts of phase rotation.

On the other hand, in an environment that is strongly frequency-selective, there is significant cross-correlation between sequences that are generated based on neighboring amounts of phase rotation, so that UCI produces more errors. Consequently, when the frequency selectivity is strong, using sequence type (1) can lower the UCI error rate compared to when sequence type (0) is used.

Figure 2:
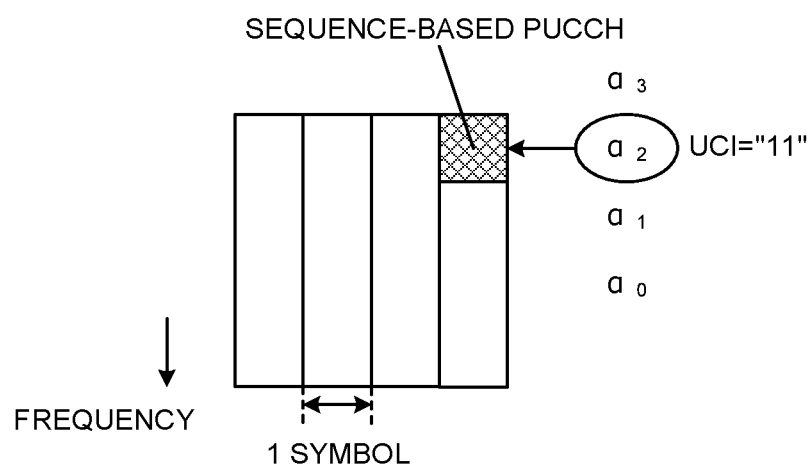
FIG. 2 is a diagram to show an example of time/frequency resources for use in sequence-based transmission.

As shown in FIG. 2, given four candidates of two-bit UCI values, a UE rotates the phase of a base sequence based on an amount of phase rotation that matches the value to transmit, and transmits the signal of the rotated phase by using a given time/frequency resource. The time/frequency resource may be a time resource (for example, a subframe, a slot, a symbol, etc.) and/or a frequency resource (for example, a carrier frequency, a channel band, a CC (Component Carrier), a PRB, etc.).

FIG. 3 provide diagrams, each showing an example of a transmission signal generation process in sequence-based transmission. In these examples of transmission signal generation processes, phase rotations (cyclic shifts) are applied to base sequences $X_0$ to $X_{M-1}$ of a sequence length M, based on selected amounts of phase rotation $\alpha$, and the phase-rotated base sequences are input in an OFDM (Orthogonal Frequency Division Multiplexing) transmitter or a DFT-S-OFDM (Discrete Fourier Transform-Spread-Orthogonal Frequency Division Multiplexing) transmitter. The UE transmits output signals from the OFDM transmitter or the DFT-S-OFDM transmitter.

When the amounts of phase rotation $\alpha_0$ to $\alpha_3$ are associated with UCI information 0 to 3, respectively, and the value 0 is reported as UCI, as shown in FIG. 3A, the UE applies phase rotations to base sequences $X_0$ to $X_{M-1}$ by using the amount of phase rotation $\alpha_0$, which is associated with value 0. Similarly, when the UE reports the values 1 to 3 as UCI, as shown in FIGS. 3B, 3C and 3D, the UE applies phase rotations to base sequences $X_0$ to $X_{M-1}$ by using the amounts of phase rotation $\alpha_1$, $\alpha_2$ and $\alpha_3$, which are associated with the values 1 to 3, respectively.

Next, how to decode UCI that is reported in sequence-based transmission will be described below. Now, although the operation of detecting receipt that is carried out when UCI is reported by selecting amounts of phase rotation will be described below, the following description will apply likewise even when UCI is reported by selecting different types of resources (for example, base sequences, time/frequency resources, etc.) or by combining multiple types of resources.

The NW may detect UCI from a received signal by using maximum likelihood detection (which may be referred to as "MLD" or "correlation detection"). To be more specific, the network may replicate each amount of phase rotation assigned to a user terminal (that is, generate replicas of phase rotation amounts) (for example, the network may generate four patterns of phase rotation amount replicas if the length of the UCI payload is two bits), and generate transmission signal waveforms, like the user terminal does, based on a base sequences and the phase rotation amount replicas. Also, the network may calculate the correlation between the transmission signal waveforms produced thus, and the waveform of the received signal from the user terminal, based on all of the phase rotation amount replicas, and assume that the phase rotation amount replica to show the highest correlation has been transmitted.

To be more specific, the network may multiply each element of received signal sequences of size M after the DFT (M complex-number sequences) by complex conjugates of transmission signal sequences (M complex-number sequences), which are given by applying phase rotations to the base sequence of the transmission signal based on phase rotation amount replicas, and assume that the phase rotation amount replica, where the absolute value (or the square of the absolute values) of the sum of the M sequences acquired is the largest, has been sent.

Alternatively, the network may generate transmission signal replicas to match the maximum number of phase rotation amounts that can be assigned (twenty four for two PRBs), and make an estimate as to which phase rotation amount yields the highest correlation with received signals, based on the same operation as above-described MLD. When the amount of phase rotation estimated is one that is not included in the amounts of phase rotation assigned, it is possible to assume that the one that is closest to the estimated value among the assigned phase rotation amounts has been transmitted.

Also, a short PUCCH for communicating two-bit HARQ-ACK and/or SR in a seven-symbol short TTI is under study. In this short PUCCH, a DMRS symbol and a UCI symbol are time-division-multiplexed (TDM). Also, frequency hopping may be applied among the first three symbols of the first slot, the last four symbols of the first slot, the first four symbols of the second slot, and the last three symbols of the second slot.

How to multiplex and/or switch various PUCCH transmission schemes, and how to report PUCCH transmission schemes and/or resources have not been decided. When individual resources are reported from the NW to UEs for various transmission schemes, the overhead of signaling increases.

So, the present inventors have worked on the method of configuring DMRS-based transmission and/or sequence-based transmission adequately and reducing the overhead of configuration-related signaling, and arrived at the present invention.

For example, a UE chooses DMRS-based transmission or sequence-based transmission based on UCI, and maps selected UL signals to given time/frequency resources. By this means, it is possible to configure common time/frequency resources in DMRS-based transmission and sequence-based transmission, so that the overhead of signaling that is sent from the NW to UEs in regard to UCI resources can be reduced.

For example, if a UE #1 chooses DMRS-based transmission and a UE #2 selects sequence-based transmission, and the DMRS sequence for use in DMRS-based transmission and the sequence for use in sequence-based transmission are CAZAC sequences, the DMRS sequence of UE #1 and the sequence of UE #2 can be code-division-multiplexed (CDM). In other words, multiple UEs can be multiplexed based on CDM, so that the spectral efficiency can be enhanced. In addition, the NW reports common time/frequency resources to UEs, and the UEs choose the resources to use from among the resources reported. By this means, the overhead of resource-related signaling from the NW to UEs can be reduced.

Now, embodiments of the present invention will be described in detail below with reference to the accompanying drawings. Note that the radio communication methods according to the following embodiments may be applied individually, or may be applied in various combinations.

In each of the following embodiments, a "symbol" might mean a "symbol" (time resource) to assume a given numerology (for example, an SCS of a given value).

Radio Communication Method

First Embodiment

Now, with the first embodiment of the present invention, how to switch and/or multiplex DMRS-based transmission and sequence-based transmission will be described below.

Switching of Transmission Scheme

A UE can choose one of DMRS-based transmission and sequence-based transmission depending on the number of UCI bits to transmit and/or the type of UCI.

When the number of UCI bits is greater than a threshold X (for example, X=2), which is configured in advance, or when the UCI is of a type that does not require high reliability, the UE may choose DMRS-based transmission. A type of UCI that does not require high reliability is, for example, a CSI report.

The UE may choose sequence-based transmission if the number of UCI bits is less than or equal to threshold X or the UCI is of a type that requires high reliability. A type of UCI that requires high reliability is, for example, an HARQ-ACK/NACK.

In sequence-based transmission, a number of code resources (for example, amounts of cyclic shifts) to match a second power of the number of UCI bits are required, but, when the number of UCI bits increases, various problems might arise such as shortage of code resources, narrowing of intervals between the amounts of phase rotation and resulting degradation of performance, an increase in the load of demodulation in the NW and so on. It then follows that, when the number of UCI bits is large, it is preferable to use DMRS-based transmission.

In DMRS-based transmission, RSs are transmitted in addition to UCI, while, in sequence-based transmission, no RS is transmitted and the whole power is used to transmit UCI, so that the BER (Bit Error Rate) performance of UCI sequence-based transmission is higher than the BER performance of DMRS-based transmission. Consequently, when UCI is of a type that requires high reliability, it is preferable to use sequence-based transmission.

Now, DMRS-based transmission and sequence-based transmission, which are candidate PUCCH transmission schemes, will be described below.

Figure 4A:
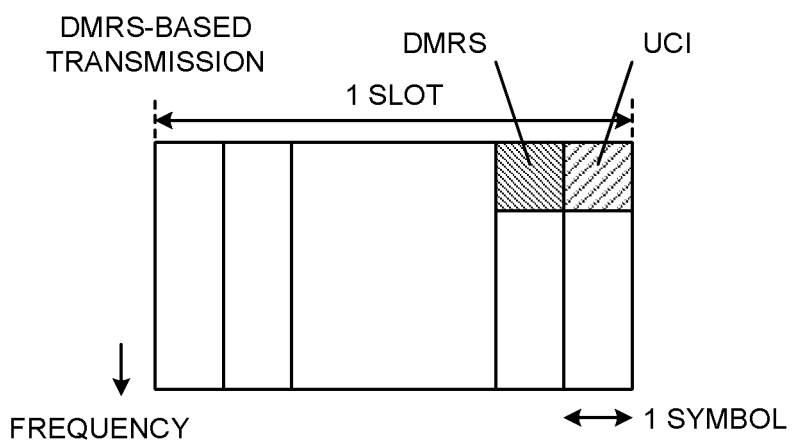
FIGS. 4A and 4B are diagrams to show examples of DMRS-based transmission and sequence-based transmission.

FIG. 4A is a diagram to show an example of DMRS-based transmission using two symbols. In this example, a specific band corresponding to the last two symbols in a slot is allocated to a PUCCH. In the PUCCH, a DMRS, which is the first symbol, and UCI, which is the second symbol, are time-division-multiplexed (TDM).

Figure 4B:
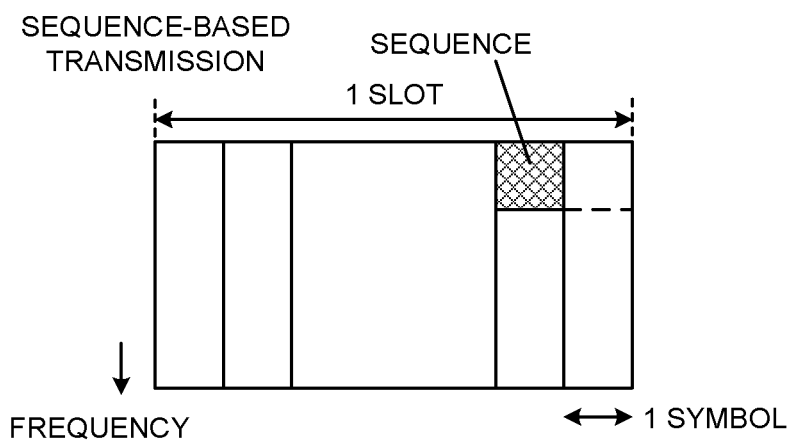

FIG. 4B is a diagram to show an example of sequence-based transmission using one symbol. In this example, the same time/frequency resource as that of the DMRS for DMRS-based transmission is allocated to the PUCCH for sequence-based transmission. That is, of the time/frequency resources for DMRS-based transmission, only the first symbol is used, and the second symbol is not used.

The UE may choose DMRS-based transmission or sequence-based transmission based on the UCI, and perform the chosen transmission using the common time/frequency resource that is configured for the PUCCH. In addition, by using time/frequency resources that are configured in common for multiple UEs' PUCCHs, an RS for a given UE in sequence-based transmission and an RS for another UE in DMRS-based transmission may be code-division-multiplexed (CDM). By configuring common time/frequency resources for DMRS-based transmission and sequence-based transmission, the overhead of reporting of PUCCH resources from the NW to UEs can be reduced.

Switching of Transmission Type in DMRS-based Transmission

DMRS-based transmission allows multiple transmission types to be configured.

Figure 5A:
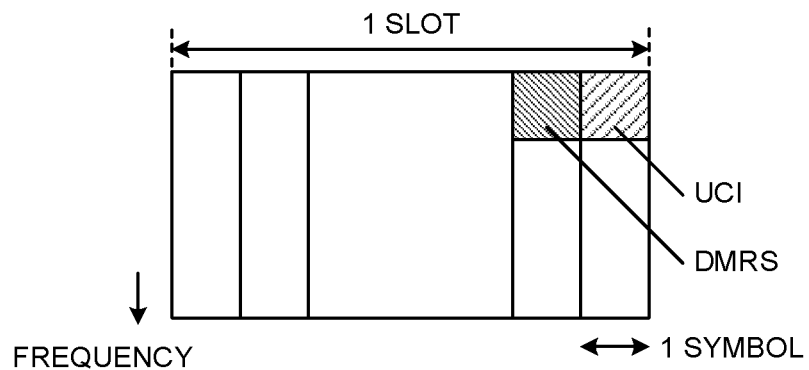
FIGS. 5A to 5C are diagram to show examples of transmission types for use in DMRS-based transmission, and sequence-based transmission.
Figure 5B:
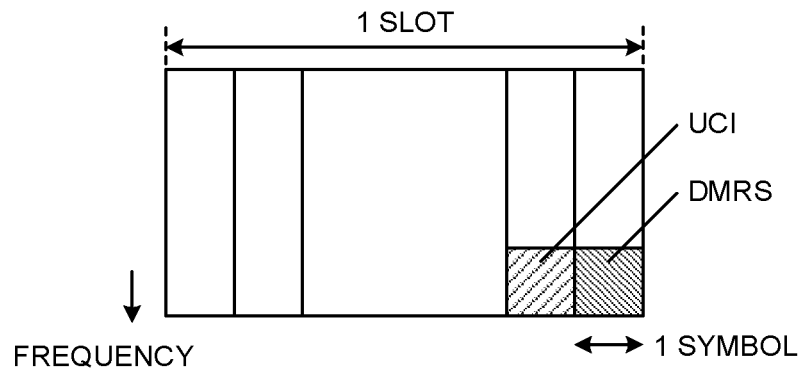

For example, as shown in FIG. 5A, when transmission type 1 is used, given a PUCCH consisting of two symbols, DMRS is transmitted in the first symbol, and UCI is transmitted in the second symbol (front RS type). For example, as shown in FIG. 5B, when transmission type 2 is used, UCI is transmitted in the first symbol, and DMRS is transmitted in the second symbol (rear RS type). Furthermore, for example, in transmission type 1, PUCCH is transmitted in the band on the high-frequency end (or in the frequency resource with the largest frequency index) of a channel band (which is, for example, a data channel's band, a CC's band, a band that is available to a UE for use, and so forth), and, in transmission type 2, PUCCH is transmitted in the band on the low-frequency end of the channel band (or in the frequency resource with the smallest frequency index).

A UE may choose the transmission type based on UE-specific parameters. For example, the UE-specific parameters may be the UEID, the HARQ process ID, and so forth. For example, the UE may choose transmission type 1 when a UE-specific parameter has an even number, or choose transmission type 2 otherwise.

If the UE chooses DMRS-based transmission based on the number of UCI bits and/or the UCI type, the UE may choose the type of transmission based on UE-specific parameters. That is, the UE may map UL signals for DMRS-based transmission and/or sequence-based transmission to time/frequency resources based on UCI and/or UE-specific parameters.

The UE may assume that the NW configures the transmission type. In this case, the NW configures the transmission type via higher layer signaling and/or physical layer signaling.

Figure 5C:
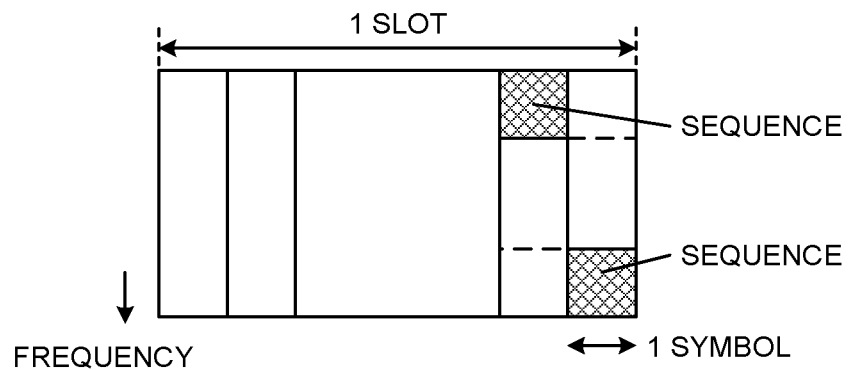

For example, when transmission types 1 and 2 are configured in DMRS-based transmission, as shown in FIG. 5C, in sequence-based transmission, the first symbol uses the same time/frequency resource as that of the DMRS of transmission type 1, and the second symbol uses the same time/frequency resource as that of the DMRS of transmission type 2. By this means, in sequence-based transmission, UCI of two symbols can be transmitted, and frequency hopping can be applied between the two symbols.

Assignment of Cyclic Shift

Cyclic shift is configured in DMRS-based transmission and sequence-based transmission.

Multiple candidate amounts of phase rotation are assigned to base sequences in sequence-based transmission. When two-bit UCI is transmitted in sequence-based transmission, four candidate code resources are assigned. The code resource is, for example, the amount of phase rotation.

Figure 6A:
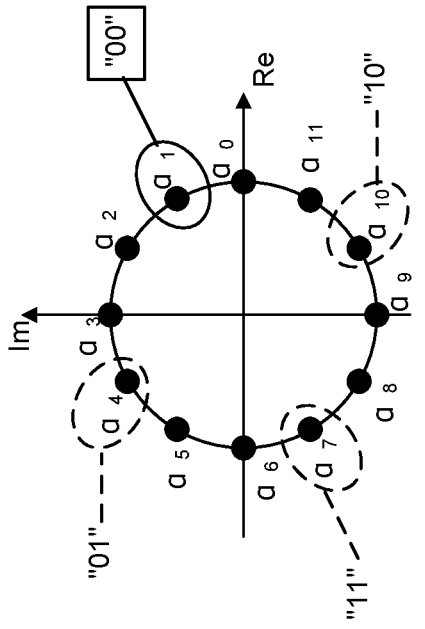
FIGS. 6A to 6D are diagrams to show examples of cyclic shifts in DMRS-based transmission and sequence-based transmission.
Figure 6B:
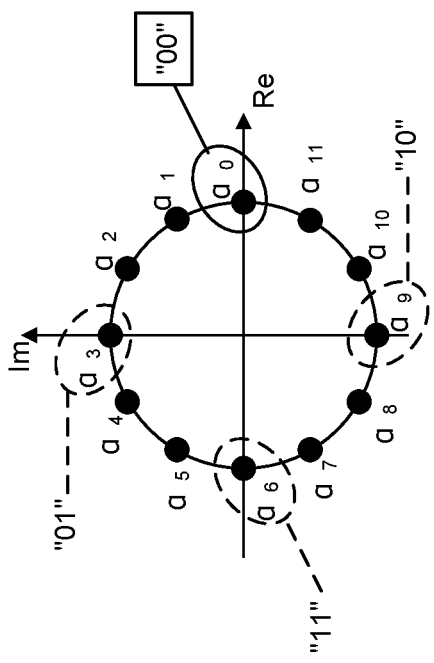
Figure 6C:
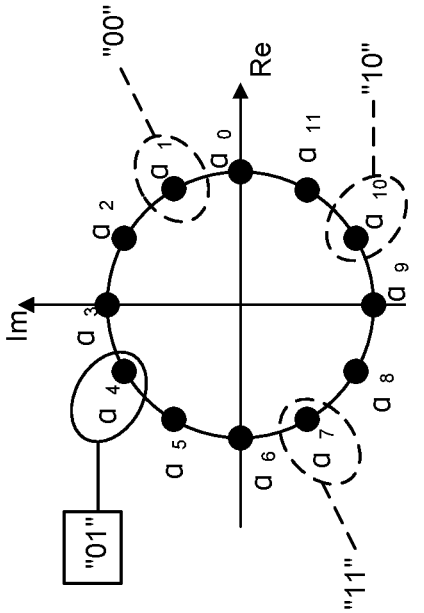

For example, when, in sequence-based transmission, two-symbol UCI is transmitted two bits at a time, as shown in FIG. 6C, $\alpha_0$, $\alpha_3$, $\alpha_6$ and $\alpha_9$, which are the four farthest distance apart candidate amounts of phase rotation among the amounts of phase rotation $\alpha_0$ to $\alpha_{11}$, are assigned as candidate amounts of phase rotation for the first symbol, and associated with the values of UCI, namely 00, 01, 11, and 10, respectively.

Figure 6D:
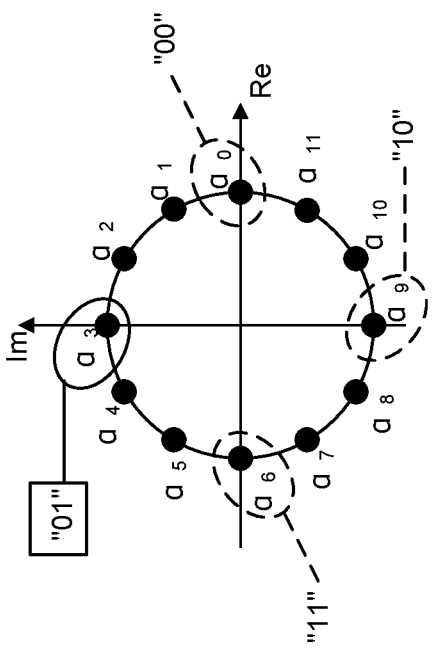

Cyclic shift may hop between the first symbol and the second symbol. As shown in FIG. 6D, $\alpha_1$, $\alpha_4$, $\alpha_7$, and $\alpha_{10}$, which are candidate amounts of phase rotation given by rotating the candidate phase rotation amounts for the first symbol to the left by one unit, are assigned as candidate amounts of phase rotation for the second symbol, and associated with the values of UCI, namely 00, 01, 11, and 10, respectively. In sequence-based transmission, cyclic shifts are applied to base sequences based on amounts of phase rotation that correspond to UCI values.

In the example of FIG. 6C, the amount of phase rotation $\alpha_3$ is used to transmit the UCI value 01 in the first symbol. Referring to the example of FIG. 6D, the amount of phase rotation $\alpha_4$ is used to transmit the UCI value 01 in the second symbol.

For a DMRS that is used in DMRS-based transmission, the same candidate amounts of phase rotation as those of the sequence for sequence-based transmission, code-division-multiplexed (CDM) with the DMRS of DMRS-based transmission, may be assigned, or only specific amounts of phase rotation among these candidate phase rotation amounts may be assigned. This eliminates the need to separately report the amounts of phase rotation for DMRS-based transmission.

For example, as shown in FIG. 6A, for the amount of phase rotation for the DMRS of the first symbol, $\alpha_0$, which is the amount of phase rotation to correspond to the UCI value 00 among four candidate amounts of phase rotation, which are the same as those for the first symbol in sequence-based transmission. As shown in FIG. 6B, for the amount of phase rotation for the DMRS of the second symbol, $\alpha_1$, which is the amount of phase rotation to correspond to the UCI value 00 among four candidate amounts of phase rotation, which are the same as those for the second symbol in sequence-based transmission.

NW Signaling

The NW reports candidate amounts of phase rotation to UEs. For example, for two-bit UCI, four candidate amounts of phase rotation are reported.

In DMRS-based transmission, the NW reports a pair of time/frequency resources (time/frequency resource blocks) to a UE. A pair of time/frequency resources is comprised of a time/frequency resource for transmission type 1 and a time/frequency resource for transmission type 2.

As shown in FIG. 4 and FIG. 5, a UE may transmit a sequence in sequence-based transmission by using the same time/frequency resource as that for a DMRS in DMRS-based transmission. This eliminates the need to report separate time/frequency resources for sequence-based transmission.

The NW may report, for example, different base sequences, from a group of CAZAC sequences, for a given UE's sequence for sequence-based transmission and for another UE's DMRS sequence for DMRS-based transmission. By this means, the signal for sequence-based transmission and the DMRS for DMRS-based transmission can be code-division-multiplexed (CDM).

The NW may report parameters related to DMRS-based transmission and sequence-based transmission through higher layer signaling, or through physical layer signaling.

Reporting Whether Scheduling Request is Present or Not

In DMRS-based transmission and/or sequence-based transmission, whether a scheduling request (SR) is positive or negative may be additionally reported.

In DMRS-based transmission, whether an SR is positive or negative may be reported by using cyclic shifts. That is to say, if there are four candidate amounts of phase rotation, an amount of phase rotation that is not used may be used to report whether an SR is positive or negative.

Figure 7A:
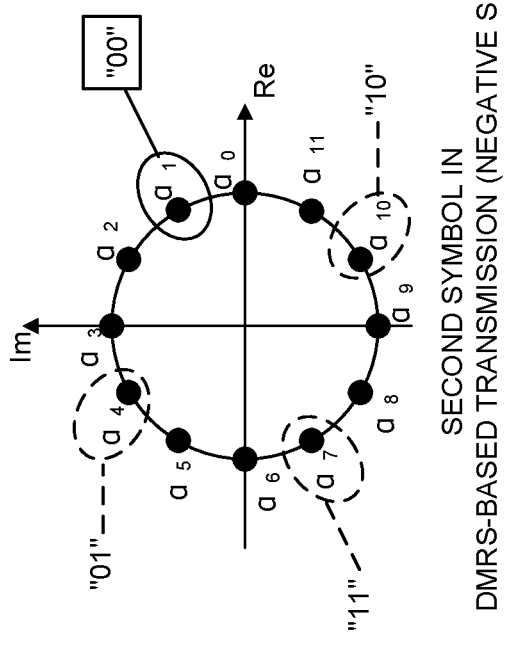
FIGS. 7A to 7D are diagrams, each showing examples of amounts of phase rotation for reporting whether an SR is positive or negative in DMRS-based transmission.
Figure 7C:
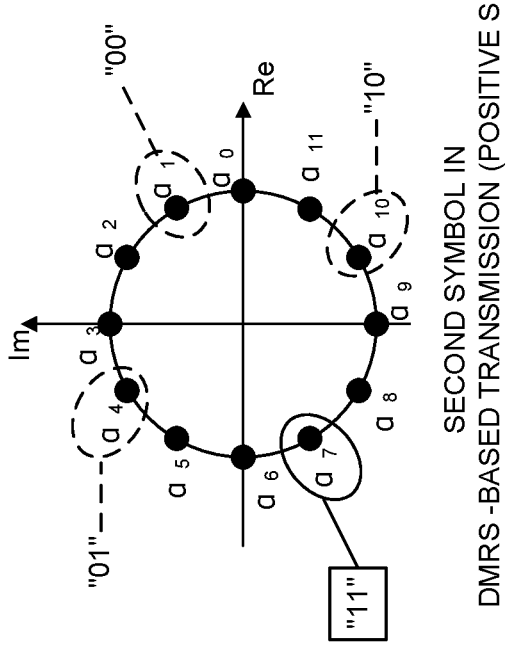
Figure 7B:
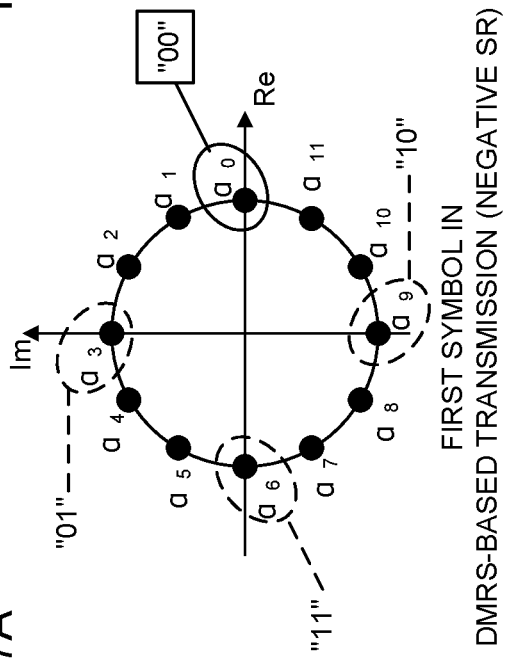

For example, for the DMRS of the first symbol, as shown in FIG. 7A, the amount of phase rotation $\alpha_0$, which corresponds to the UCI value 00 (which is, for example, a NACK-NACK) in sequence-based transmission, may be used to report a negative SR, or, as shown in FIG. 7B, the amount of phase rotation $\alpha_6$, which corresponds to the UCI value 11 (which is, for example, an ACK-ACK) in sequence-based transmission, may be used to report a positive SR.

Figure 7D:
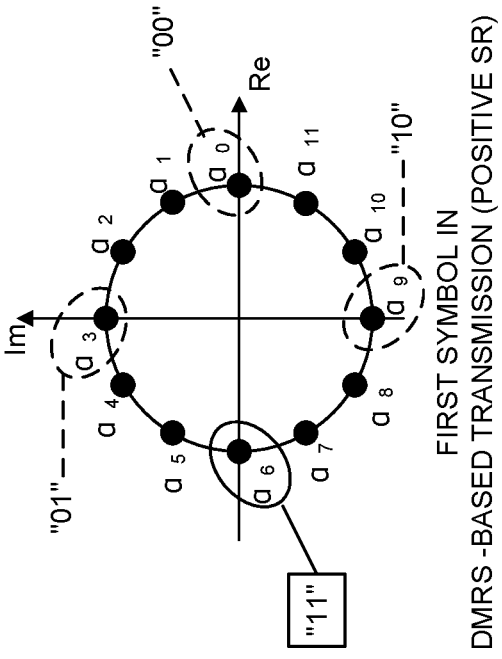

For example, for the DMRS of the second symbol, as shown in FIG. 7C, the amount of phase rotation $\alpha_1$, which corresponds to the UCI value 00 (which is, for example, a NACK-NACK) in sequence-based transmission, may be used to report a negative SR, or, as shown in FIG. 7D, the amount of phase rotation $\alpha_7$, which corresponds to the UCI value 11 (which is, for example, an ACK-ACK) in sequence-based transmission, may be used to report a positive SR.

In DMRS-based transmission, whether an SR is positive or negative may be reported by using transmission types. By this means, whether an SR is positive or negative can be reported without increasing the number of symbols (or the number of PRBs to transmit) in DMRS-based transmission.

Figure 8A:
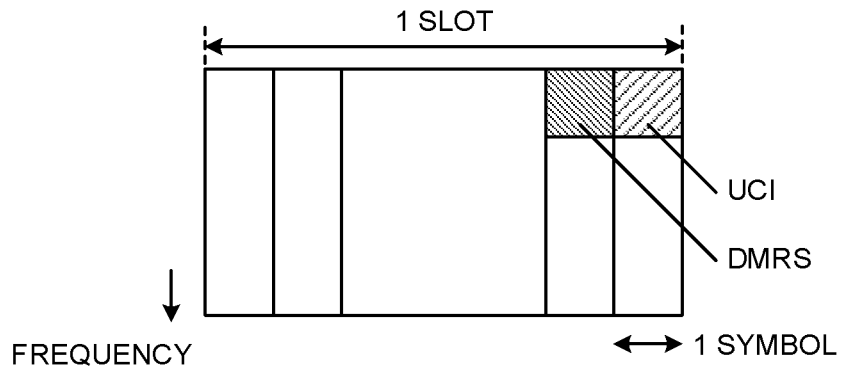
FIGS. 8A and 8B are diagrams, each showing an example of a transmission type of DMRS-based transmission for reporting whether an SR is positive or negative.
Figure 8B:
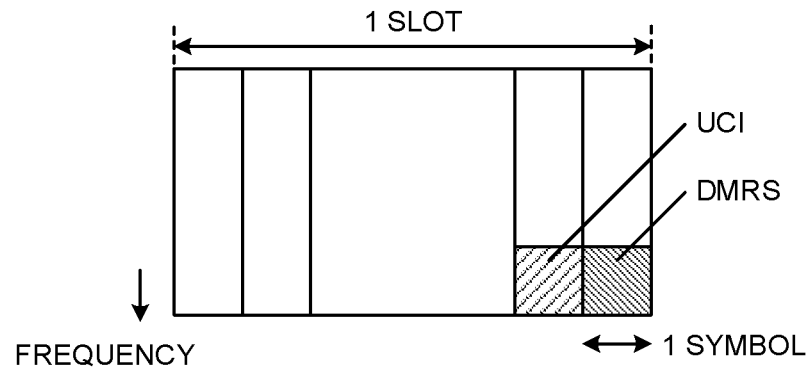

For example, in DMRS-based transmission, as shown in FIG. 8A, transmission type 1 may be used to report a negative SR, and, as shown in FIG. 8B, transmission type 2 may be used to report a positive SR.

In sequence-based transmission, whether an SR is positive or negative may be reported by using cyclic shift hopping patterns. By this means, whether an SR is positive or negative can be reported without changing the intervals between candidate phase rotation amounts for use in sequence-based transmission, and without lowering the BER performance of UCI.

When reporting a negative SR, for example, as shown in FIG. 9A, the candidate amounts of phase rotation $\alpha_0$, $\alpha_3$, $\alpha_6$ and $\alpha_9$ are used in the first symbol, or, as shown in FIG. 9B, the candidate amounts of phase rotation $\alpha_1$, $\alpha_4$, $\alpha_7$ and $\alpha_{10}$ are used in the second symbol. That is, a hopping pattern to rotate candidate amounts of phase rotation to the left by one unit is used here.

When reporting a positive SR, for example, as shown in FIG. 9C, the candidate amounts of phase rotation $\alpha_0$, $\alpha_3$, $\alpha_6$ and $\alpha_9$ are used in the first symbol, or, as shown in FIG. 9D, the candidate amounts of phase rotation $\alpha_{11}$, $\alpha_2$, $\alpha_5$ and $\alpha_8$ are used in the second symbol. That is, a hopping pattern to rotate candidate amounts of phase rotation to the right by one unit is used here.

According to the first embodiment described above, it is possible to transmit UCI by appropriately switching or multiplexing DMRS-based transmission and sequence-based transmission.

Second Embodiment

With a second embodiment of the present invention, frequency hopping in DMRS-based transmission and sequence-based transmission will be described below. That is, the UE maps UL signals for DMRS-based transmission and sequence-based transmission to different frequency resources at different time resources.

Two-Symbol PUCCH

Figure 10A:
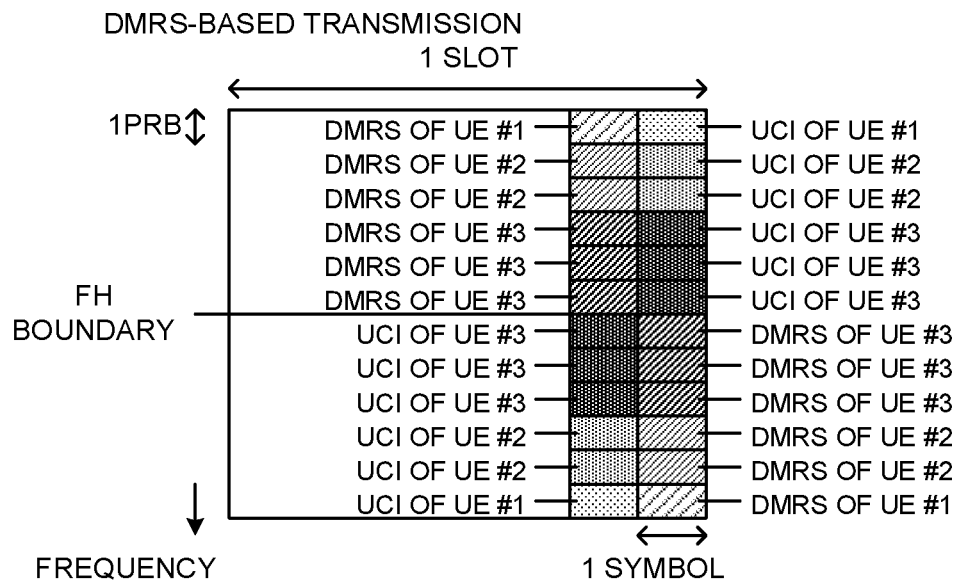
FIGS. 10A and 10B are diagrams, each showing an example of frequency hopping in a two-symbol PUCCH.

When a two-symbol PUCCH is used, one frequency hopping (FH) boundary may be provided in a channel band, as shown in FIG. 10A. The center frequency of a channel band may be an implicit location for a FH boundary. In DMRS-based transmission and/or sequence-based transmission, a UE hops between frequencies by mapping UL signals, which are mapped to different symbols, to frequency resources across the FH boundary.

The PUCCH may be mapped to the UE in part of the frequency resources of the channel band. The UE may choose the transmission type of DMRS-based transmission depending on to which frequency resource the PUCCH is mapped.

For example, if the frequency resource where the PUCCH is mapped is a frequency resource that is lower than the FH boundary, the UE may choose transmission type 1 for DMRS-based transmission, and, if the frequency resource where the PUCCH is mapped is a frequency resource that is higher than the FH boundary, the UE may choose transmission type 2 for DMRS-based transmission.

A given UE's UL signal is frequency-division-multiplexed (FDM) with a UL signal that is transmitted from another UE, in one of a plurality of bands divided by the FH boundary. In the example of FIG. 10A, frequency resources having bandwidths of one PRB, two PRBs and three PRBs are allocated to UEs #1, #2, and #3, respectively. A set of multiple locations in the cell (for example, distances from the base station, beams, and so on) and bandwidths (or frequency resources) may be reported from the NW to the UEs, so that the UEs can select their bandwidths based on locations. The NW may report bandwidths (or frequency resources) to the UEs.

Figure 10B:
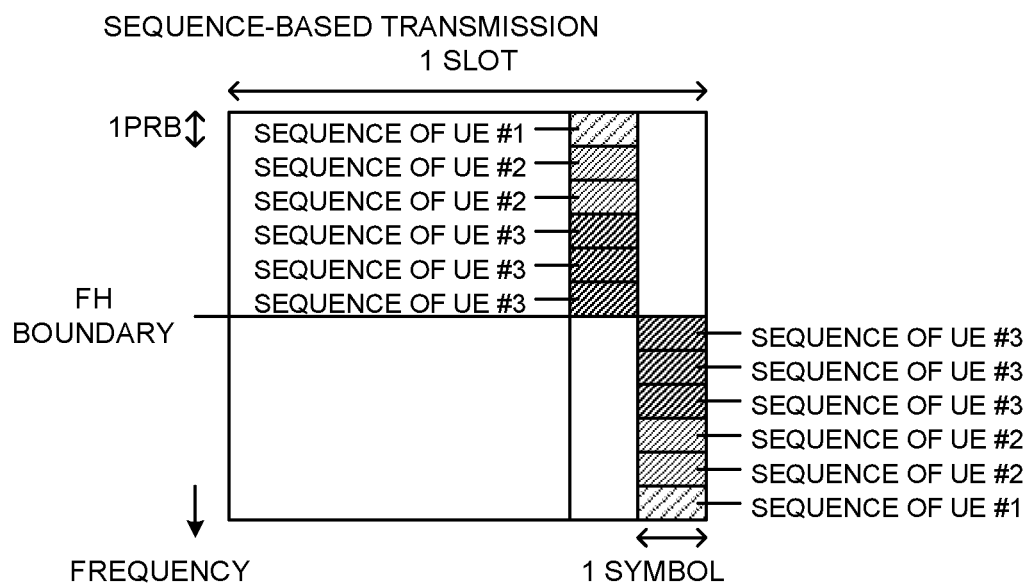

In this case, as shown in FIG. 10B, each UE transmits the sequence in sequence-based transmission by using the time/frequency resource for the DMRS for DMRS-based transmission. This eliminates the need to separately report frequency hopping in sequence-based transmission.

Note that DMRSs for use in DMRS-based transmission and sequences for use in sequence-based transmission, belonging to a number of different UEs, may be code-division-multiplexed (CDM) or frequency-division-multiplexed (FDM). Also, DMRS-based transmissions and sequence-based transmissions by a number of different UEs may be time-division-multiplexed (TDM).

Three-Symbol PUCCH

Figure 11A:
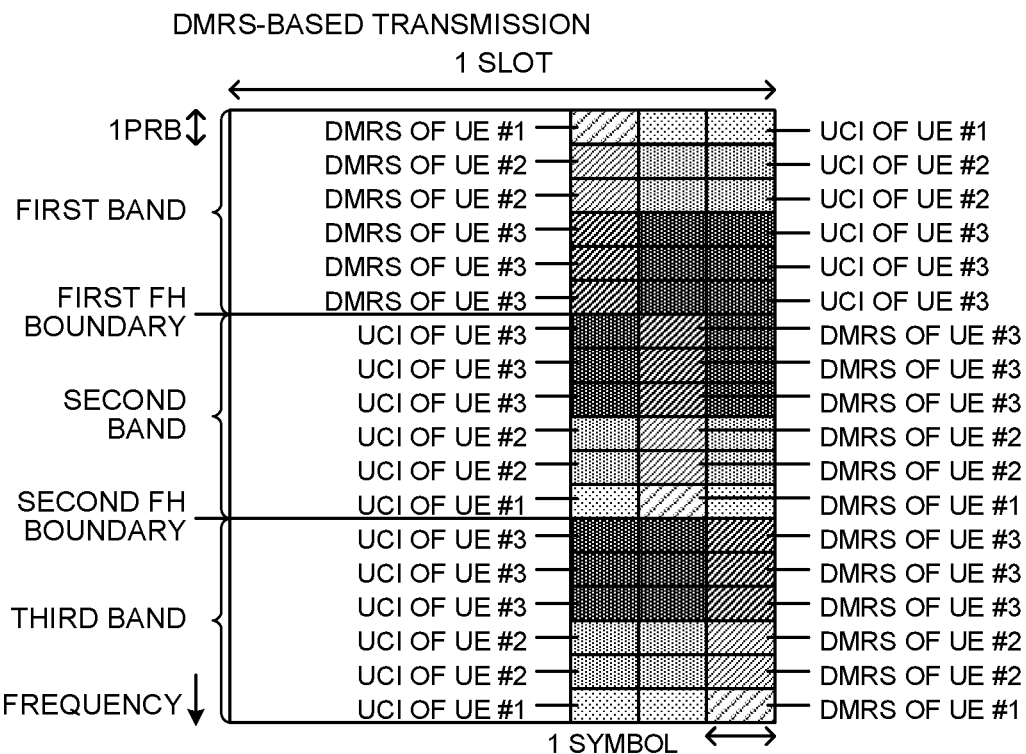
FIGS. 11A and 11B are diagrams, each showing an example of frequency hopping in a three-symbol PUCCH.

When a three-symbol PUCCH is used, as shown in FIG. 11A, a first FH boundary and a second FH boundary of a higher frequency than the first FH boundary may be configured in a channel band. The FH boundaries may be configured in advance.

Here, three transmission types A, B and C may be configured for DMRS-based transmission. For example, in transmission type A, the DMRS is transmitted in the first symbol, and the UCI is transmitted in the second and third symbols. In transmission type B, the DMRS is transmitted in the second symbol, and the UCI is transmitted in the first and third symbols. In transmission type C, the DMRS is transmitted in the third symbol, and the UCI is transmitted in the first and second symbols.

A UE may choose the transmission type of DMRS-based transmission depending on which frequency resource the PUCCH is mapped to.

For example, transmission type A may be chosen for DMRS-based transmission if the frequency resource where the PUCCH is mapped is a frequency resource that is lower than the first FH boundary, transmission type B may be chosen for DMRS-based transmission if the frequency resource where the PUCCH is mapped is higher than the first frequency boundary and lower than the second frequency boundary, and transmission type C may be chosen for DMRS-based transmission if the frequency resource where the PUCCH is mapped is a frequency resource that is higher than the second FH boundary.

In the example of FIG. 11A, frequency resources having bandwidths of one PRB, two PRBs and three PRBs are allocated to UEs #1, #2 and #3, respectively.

Figure 11B:
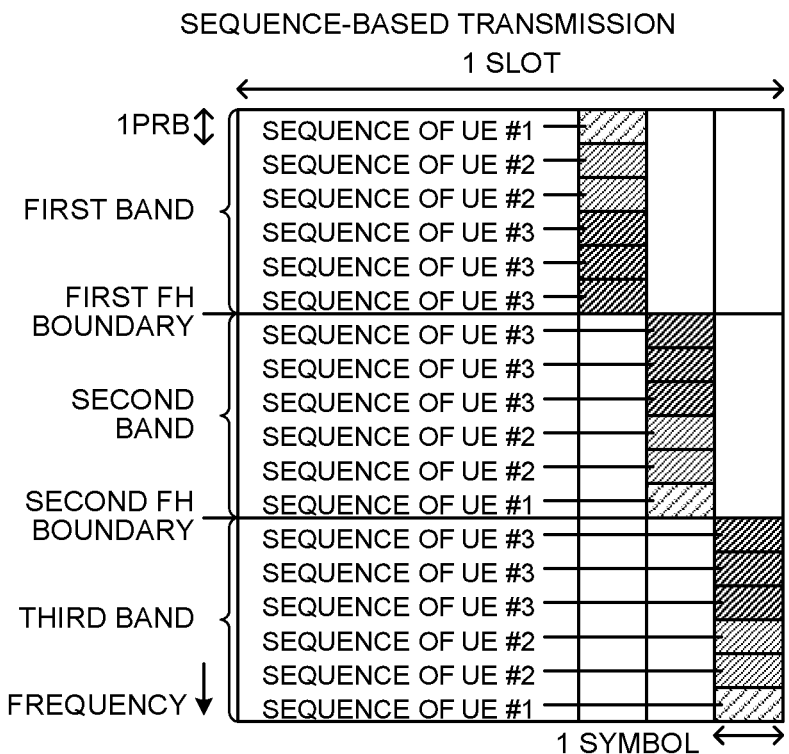

In this case, as shown in FIG. 11B, each UE transmits a sequence in sequence-based transmission by using the time/frequency resource for the DMRS for DMRS-based transmission. This eliminates the need to separately report frequency hopping in sequence-based transmission.

In sequence-based transmission, one of a number of FH patterns may be used. The UEs may assume that the NW configures the FH pattern via higher layer signaling and/or cell-specific signaling.

Now, timings to transmit sequences will be shown below, where the letter "S" indicates that a sequence is transmitted in one of {the first symbol, the second symbol and the third symbol} in a certain band, and the symbol "–" indicates that no sequence is not transmitted. For example, the timing at which a sequence is transmitted in the first symbol in a certain band is represented by {S - -}. Furthermore, FH patterns will be shown below, where the transmission timings in the first band, which is lower than the first FH boundary, a second band, which is located between the first FH boundary and the second FH boundary, and a third band, which is higher than the second FH boundary are shown as {the transmission timing in the first band}, {the transmission timing in the second band} and {the transmission timing in the third band}, respectively. For example, an FH pattern to transmit sequences in the first symbol in the first band, the second symbol in the second band and the third symbol in the third band is represented by {S - -}, {- S -} and {- - S}.

For example, following FH patterns 1 to 4 can be configured.

FH pattern 1: {S - -}, {- S -} and {- - S}
FH pattern 2: {S - -}, {- S -} and {- - -}
FH pattern 3: {- - -}, {- S -} and {- - S}
FH pattern 4: {S - -}, {- - -} and {- - S}

Of these, in FH patterns 2 to 4, sequences are transmitted in two of the three symbols. FH patterns to transmit sequences in two symbols can achieve a frequency diversity effect and reduced power consumption. FH pattern 1, in which sequences are transmitted in three symbols, can improve the frequency diversity effect, compared with the FH patterns to transmit sequences in two symbols.

Figure 12A:
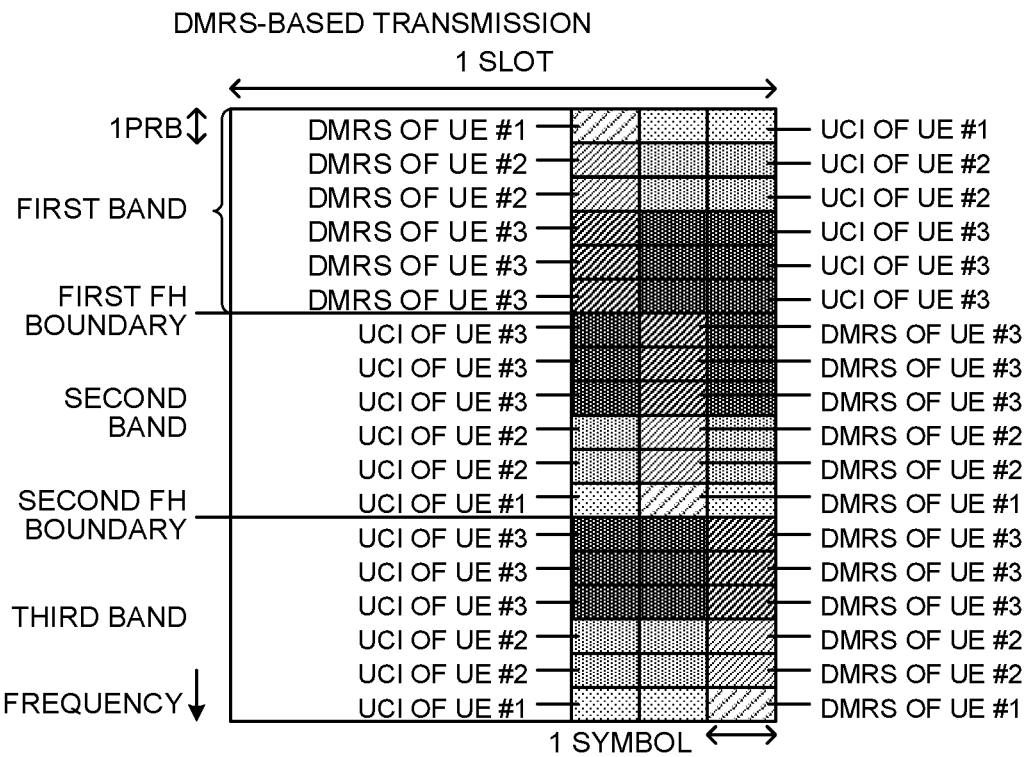
FIGS. 12A and 12B are diagrams, each showing another example of frequency hopping in a three-symbol PUCCH.
Figure 12B:
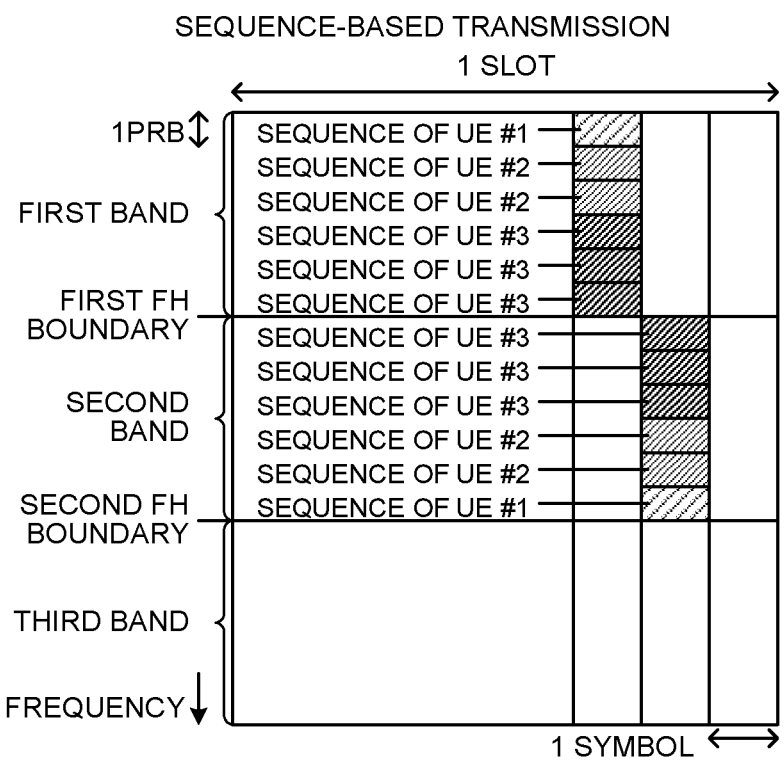

As shown in FIG. 12A, which is similar to FIG. 11A, even when DMRS-based transmission is carried out so that frequency hopping of DMRSs spans three symbols and three bands, sequence-based transmission can be carried out so that, as shown in FIG. 12B, sequences are transmitted only in the first and second symbols by using FH pattern 2. This allows the UEs to flexibly determine the FH patterns and the number of symbols to use in sequence-based transmission, based on DMRS-based transmission.

Preventing Collisions with SRS Transmission

Assuming the case where short PUCCHs of two and three symbols are placed in one subframe (fourteen symbols and two slots), studies are underway to set the number of symbols of these short PUCCHs to {3, 2, 2, 2, 2 and 3}. Assuming the case where an SRS is transmitted in the last symbol of the second slot in this subframe (SRS subframe), how a PUCCH is used to prevent collisions with SRS transmission will be described below.

Figure 13A:
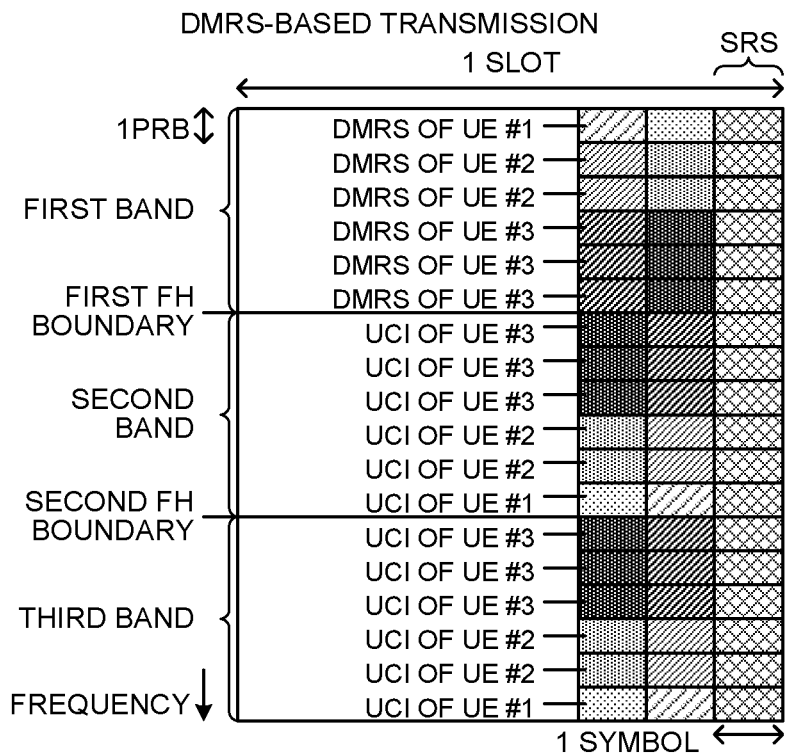
FIGS. 13A and 13B are diagrams, each showing an example of preventing collisions between PUCCH and SRS transmission.

For example, as shown in FIG. 13A, when DMRS-based transmission is performed using the last three symbols of the second slot of an SRS subframe, among transmission types A, B and C, either transmission type A or B is selected. That is, the UE chooses a transmission type that transmits no DMRS in the last symbol where an SRS is transmitted.

In this example, the first FH boundary is configured, and, in the DMRS-based transmission mapped to the first band, DMRSs are transmitted in the first symbol, and, in the DMRS-based transmission mapped to the second and third bands, DMRSs are transmitted in the second symbol.

The SRS subframe may be a cell-specific and/or a UE-specific SRS subframe. A UE may drop or puncture the UCI of the last symbol in this three-symbol DMRS-based transmission.

Figure 13B:
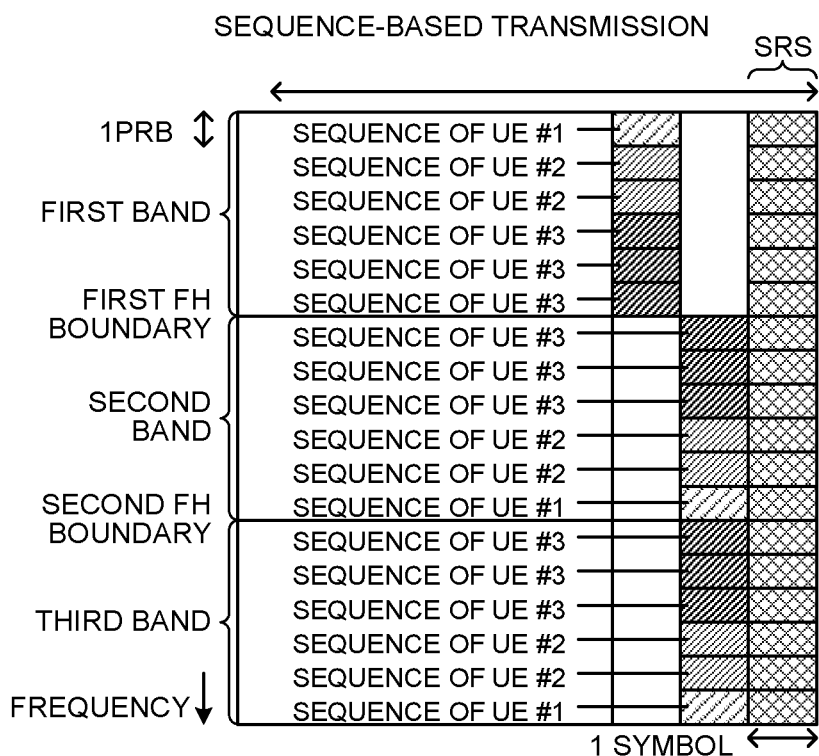

In this case, as shown in FIG. 13B, based on the mapping of DMRSs in DMRS-based transmission, sequence-based transmission might use one of an FH pattern to transmit sequences in the first symbol and an FH pattern to transmit sequences in the second symbol.

In this example, sequence-based transmission to apply frequency hopping between the first band of the first symbol and the second band of the second symbol is carried out by using FH pattern 2. In the remaining third band, sequence-based transmission of one symbol is carried out in the second symbol, in accordance with the DMRSs. By this means, even when there is a band that is not subjected to frequency hopping, it can be used in sequence-based transmission.

Also, even when using a three-symbol PUCCH, an FH boundary may be provided at the center frequency of the channel band, and frequency hopping may be applied between the band of the first symbol, which is lower than the FH boundary, and the band of the second symbol, which is higher than the FH boundary. By this means, frequency hopping can be performed over the whole channel band.

Here, a UE transmits an SRS in the last symbol, and drops the UCI for DMRS-based transmission. By this means, the accuracy of PUSCH scheduling can be improved, and the throughput of UL data can be improved.

Also, the UE may drop the SRS of the last symbol and transmit the UCI for DMRS-based transmission instead. In this case, the performance of the PUCCH can be improved, and the cell coverage can be expanded.

Seven-Symbol Short TTI

When a UE uses a seven-symbol short TTI, the UE may assume transmitting a sequence for sequence-based transmission by using the time/frequency resource for the DMRS for DMRS-based transmission.

Short TTIs of seven symbols are under study to apply frequency hopping among the first three symbols of the first slot, the last four symbols of the first slot, the first four symbols of the second slot, and the last three symbols of the second slot. Two options for frequency hopping are under research. Here, a symbol in which a DMRS for DMRS-based transmission is transmitted will be labeled "R," and a symbol where UCI for DMRS-based transmission is transmitted will be labeled "D."

In option 1, the first slot is represented by {DRD|DRRD}, and the second slot is represented by {DRRD|DRD}.

In option 2, the first slot is represented by {DDR|RRDD}, and the second slot is represented by {DDRR|RDD}.

Figure 14A:
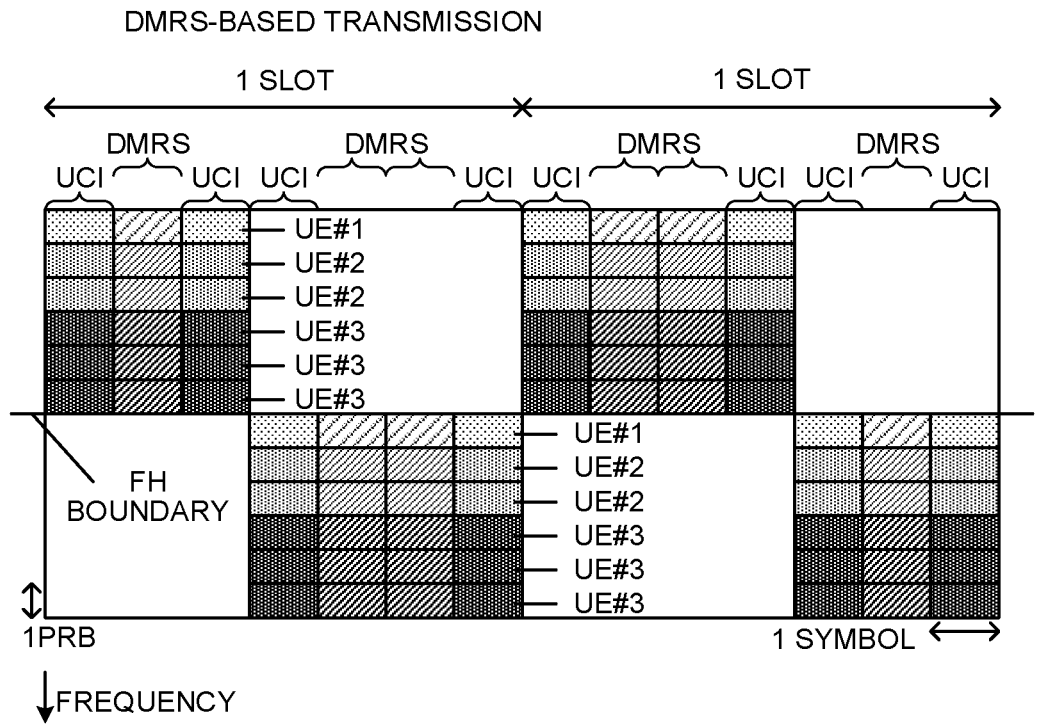
FIGS. 14A and 14B are diagrams, each showing an example of frequency hopping in seven-symbol short TTIs.

When option 1 is used, for example, as shown in FIG. 14A, an FH boundary is configured at the center frequency of the channel band. In DMRS-based transmission, a frequency band that is lower than the FH boundary is used in the first three symbols of the first slot and in the first four symbols of the second slot, a frequency band that is higher than the FH boundary is used in the last four symbols of the first slot and in the last three symbols of the second slot.

In this case, bandwidths of one PRB, two PRBs, and three PRBs are allocated to UEs #1, #2, and #3, respectively.

Figure 14B:
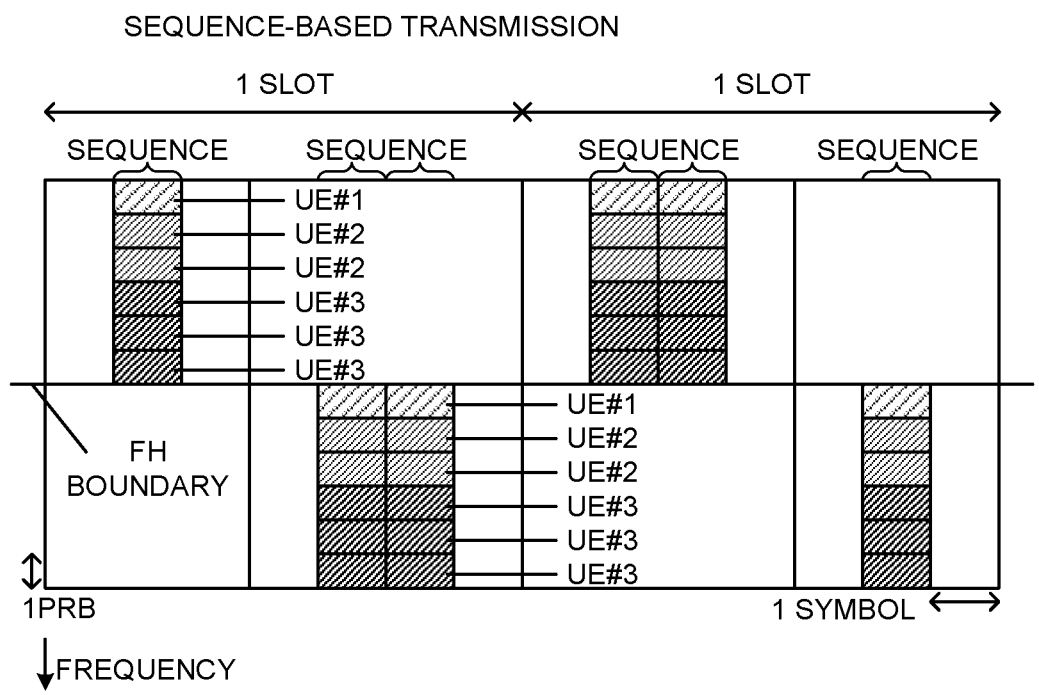

In this case, as shown in FIG. 14B, in sequence-based transmission, sequences are transmitted using DMRS time/frequency resources for use in DMRS-based transmission.

Similarly, DMRS-based transmission and/or sequence-based transmission can be performed even when option 2 is used.

By this means, DMRS-based transmission and/or sequence-based transmission can be performed in a way to suit the frequency hopping pattern of seven-symbol short TTIs.

Radio Communication System

Now, the structure of the radio communication system according to one embodiment of the present invention will be described below. In this radio communication system, communication is performed using one or a combination of the radio communication methods according to the herein-contained embodiments of the present invention.

Figure 15:
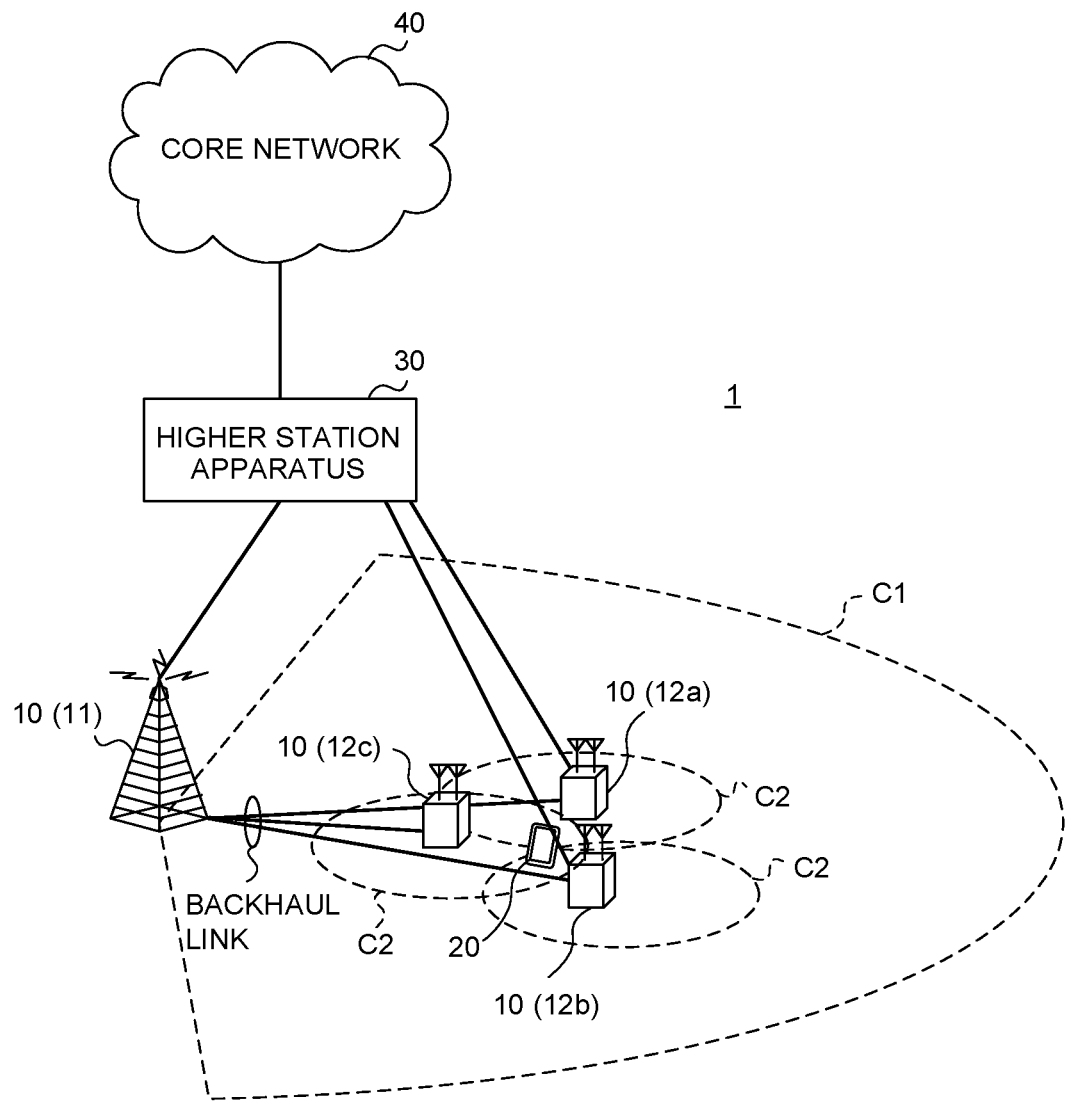
FIG. 15 is a diagram to show an exemplary schematic structure of a radio communication system according to one embodiment of the present invention.

FIG. 15 is a diagram to show an exemplary schematic structure of a radio communication system according to the present embodiment. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that the radio access schemes for the uplink and the downlink are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported via DCI. For example, DCI to schedule receipt of DL data may be referred to as "DL assignment," and DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

Radio Base Station

Figure 16:
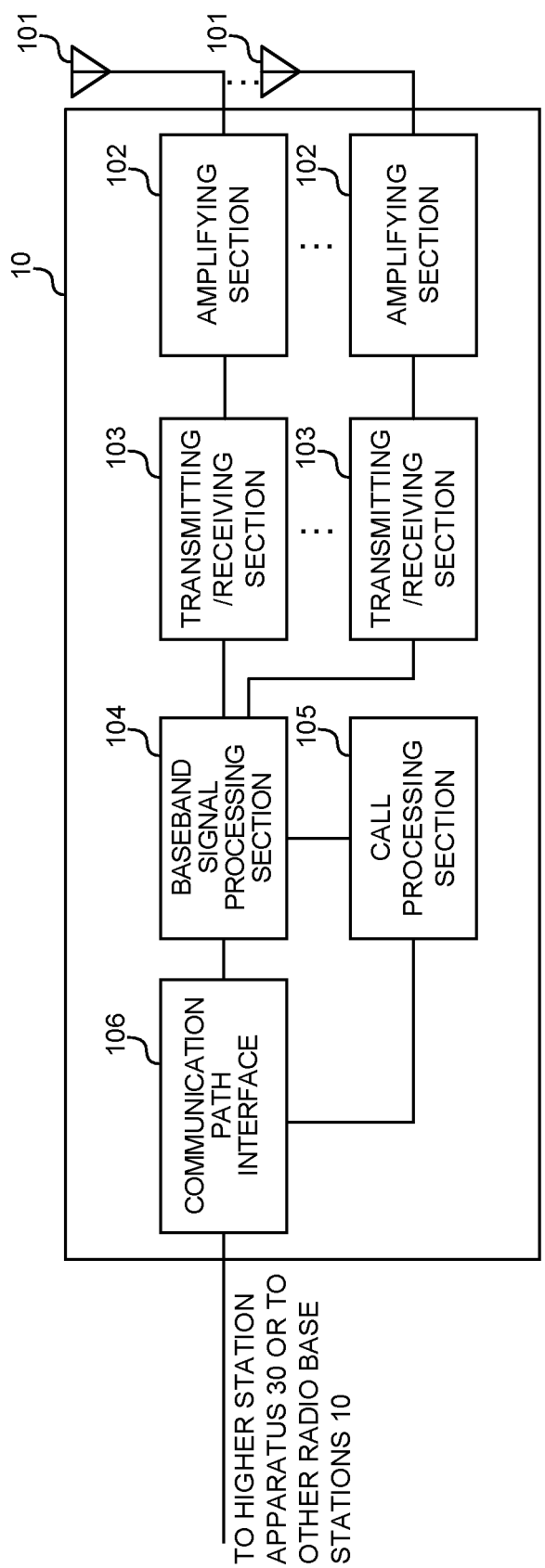
FIG. 16 is a diagram to show an exemplary overall structure of a radio base station according to one embodiment of the present invention.

FIG. 16 is a diagram to show an exemplary overall structure of a radio base station according to one embodiment of the present invention. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

In addition, the transmitting/receiving sections 103 may receive a UL signal, in which a reference signal (for example, a DMRS for DMRS-based transmission) for demodulating first UL control information (UCI) and a sequence signal (for example, a sequence for sequence-based transmission) to use a sequence (for example, a code resource) that is associated with a value of second UL control information (UCI) are code-division-multiplexed.

In addition, the transmitting/receiving sections 103 may receive a signal, in which UL signals transmitted from a number of user terminals are frequency-division-multiplexed in one of a plurality of bands divided by at least one boundary (for example, an FH boundary).

Figure 17:
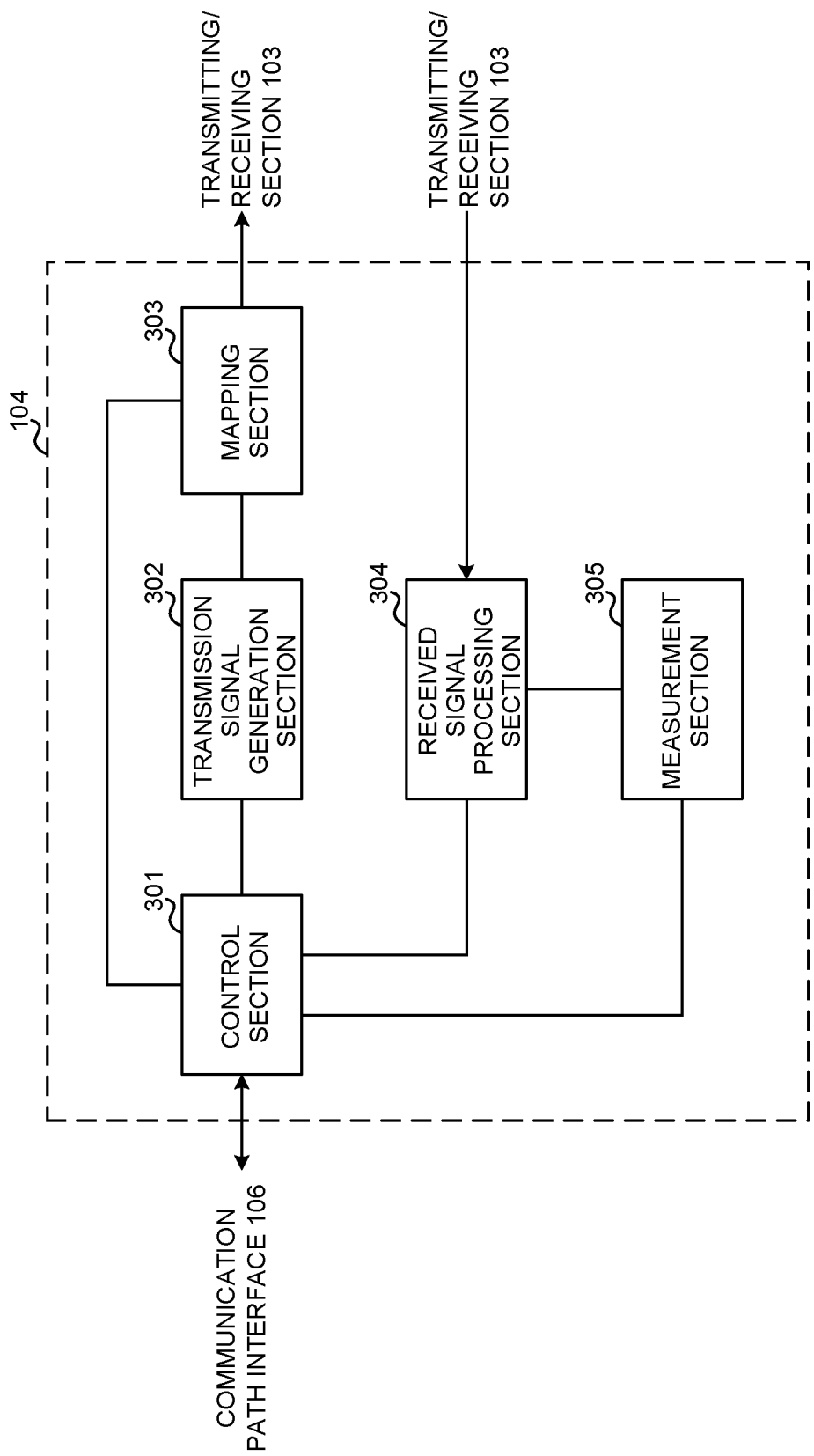
FIG. 17 is a diagram to show an exemplary functional structure of a radio base station according to one embodiment of the present invention.

FIG. 17 is a diagram to show an exemplary functional structure of a radio base station according to the present embodiment. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls generation of signals in the transmission signal generation section 302, allocation of signals in the mapping section 303, and so on. Furthermore, the control section 301 controls the signal receiving process in the received signal processing section 304, measurements of signals in the measurement section 305, and so on.

The control section 301 controls scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). The control section 301 controls generation of downlink control signals, downlink data signals and so on, depending on whether or not retransmission control is necessary, which is decided based on uplink data signals. Also, the control section 301 controls scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 controls scheduling of uplink data signals (for example, signals transmitted in the PUCCH), uplink control signal (for example, signals transmitted in the PUCCH and/or the PUSCH, such as delivery acknowledgment information), random access preambles (for example, signal transmitted in the PUSCH), uplink reference signals, and so on.

The transmission signal generation section 302 generates downlink signals (downlink control signals, downlink data signals, downlink reference signals and so on) as commanded by the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, as commanded by the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources as commanded by the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

Furthermore, the control section 301 may allocate resources (for example, at least one of time resources, frequency resources and code resources) for use for UL control information (for example, DMRS-based transmission and/or sequence-based transmission) of the user terminals 20, and report the allocated resources to the respective user terminals 30.

User Terminal

Figure 18:
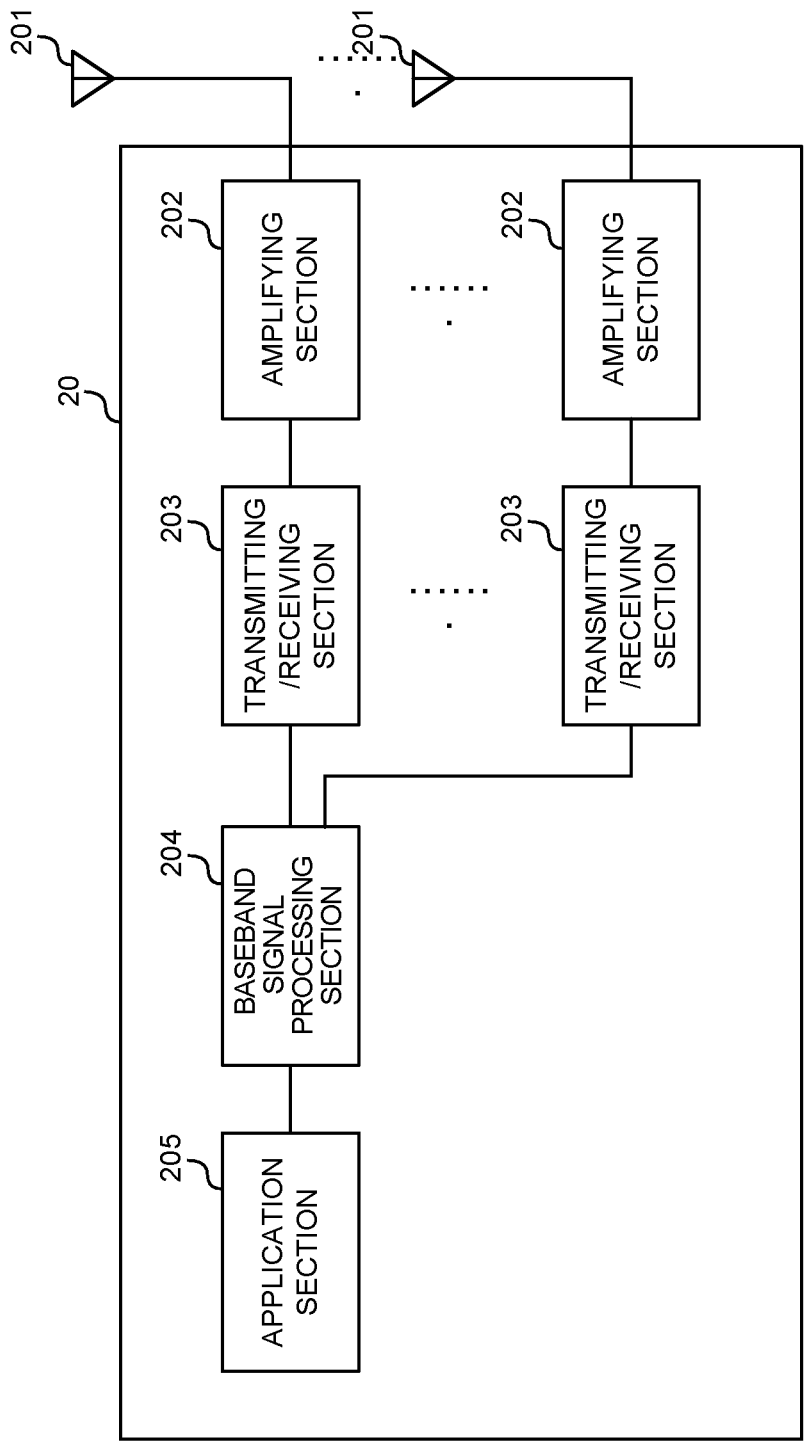
FIG. 18 is a diagram to show an exemplary overall structure of a user terminal according to one embodiment of the present invention.

FIG. 18 is a diagram to show an exemplary overall structure of a user terminal according to one embodiment of the present invention. A user terminal 20 has a number of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 may transmit a signal in which a reference signal for demodulating first UL control information and a signal sequence to use a sequence that is associated with a value of second UL control information are code-division-multiplexed.

In addition, the transmitting/receiving sections 203 may receive information to indicate resources (at least one of a time resource, a frequency resource, and a code resource) for use for UL control information (for example, DMRS-based transmission and/or sequence-based transmission) of the user terminal 20.

Figure 19:
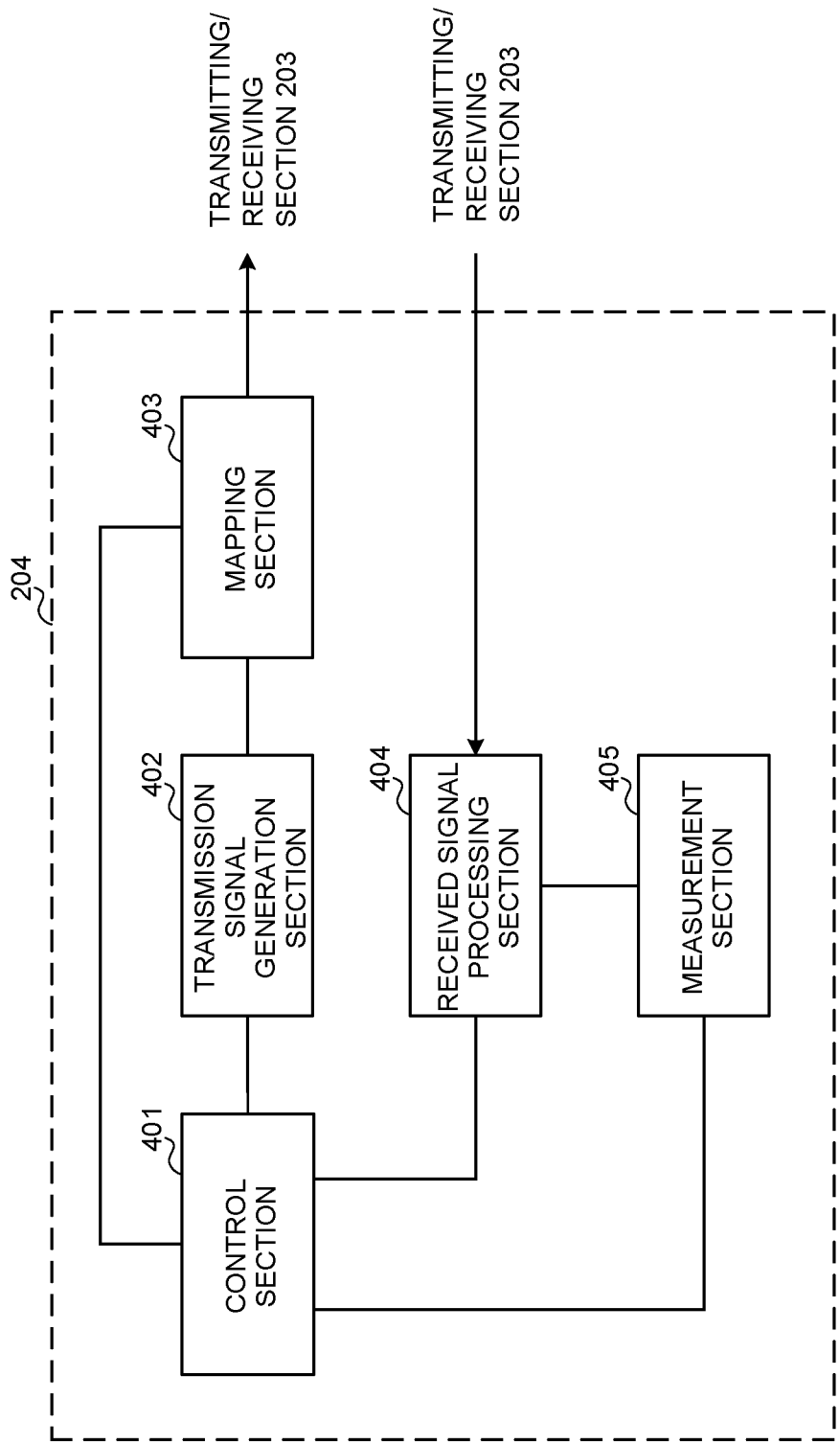
FIG. 19 is a diagram to show an exemplary functional structure of a user terminal according to one embodiment of the present invention.

FIG. 19 is a diagram to show an exemplary functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401, for example, controls generation of signals in the transmission signal generation section 402, allocation of signals in the mapping section 403, and so on. Furthermore, the control section 401 controls the signal receiving process in the received signal processing section 404, measurements of signals in the measurement section 405, and so on.

The control section 401 acquires downlink control signals and downlink data signals transmitted from the radio base station 10, via the received signal processing section 404. The control section 401 controls generation of uplink control signals and/or uplink data signals depending on whether or not retransmission control is necessary, which is decided based on the downlink control signals and/or the downlink data signals, and so on.

Furthermore, when various pieces of information reported from the radio base station 10 are acquired via the received signal processing section 404, the control section 401 may update the parameters for use for control based on these pieces of information.

The transmission signal generation section 402 generates uplink signals (uplink control signals, uplink data signals, uplink reference signals, etc.) as commanded by the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, as commanded by the control section 401. Also, the transmission signal generation section 402 generates uplink data signals as commanded by the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources as commanded by the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

In addition, the control section 401 may control code division multiplexing of a reference signal for demodulating first UL control information and a signal sequence to use a sequence that is associated with a value of second UL control information. Furthermore, the control section 401 may also controls mapping of multiple signal sequences to different frequency resources (for example, PRBs) in different time resources (for example, symbols).

In addition, the control section 401 may control time division multiplexing of first UL control information and a reference signal.

The control section 401 may also controls mapping of a signal sequence comprised of adjacent time resources (for example, symbols) to frequency resources across at least one boundary that is configured in a band (for example, a channel band). That is, the control section 401 allows a signal sequence that spans multiple time resources to hop between frequencies.

Also, a UL signal may be frequency-division-multiplexed with a UL signal transmitted from another user terminal 20 in one of a plurality of bands divided by at least one boundary.

Also, the control section 401 may control mapping of reference signals or signal sequences based on UL control information and/or parameters that are specific to the user terminal 20 (for example, the UEID, the HARQ process ID, and so forth).

Hardware Structure

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically integrated, or may be realized by directly and/or indirectly connecting two or more physically and/or logically separate pieces of apparatus (via wire or wireless, for example) and using these multiple pieces of apparatus.

Figure 20:
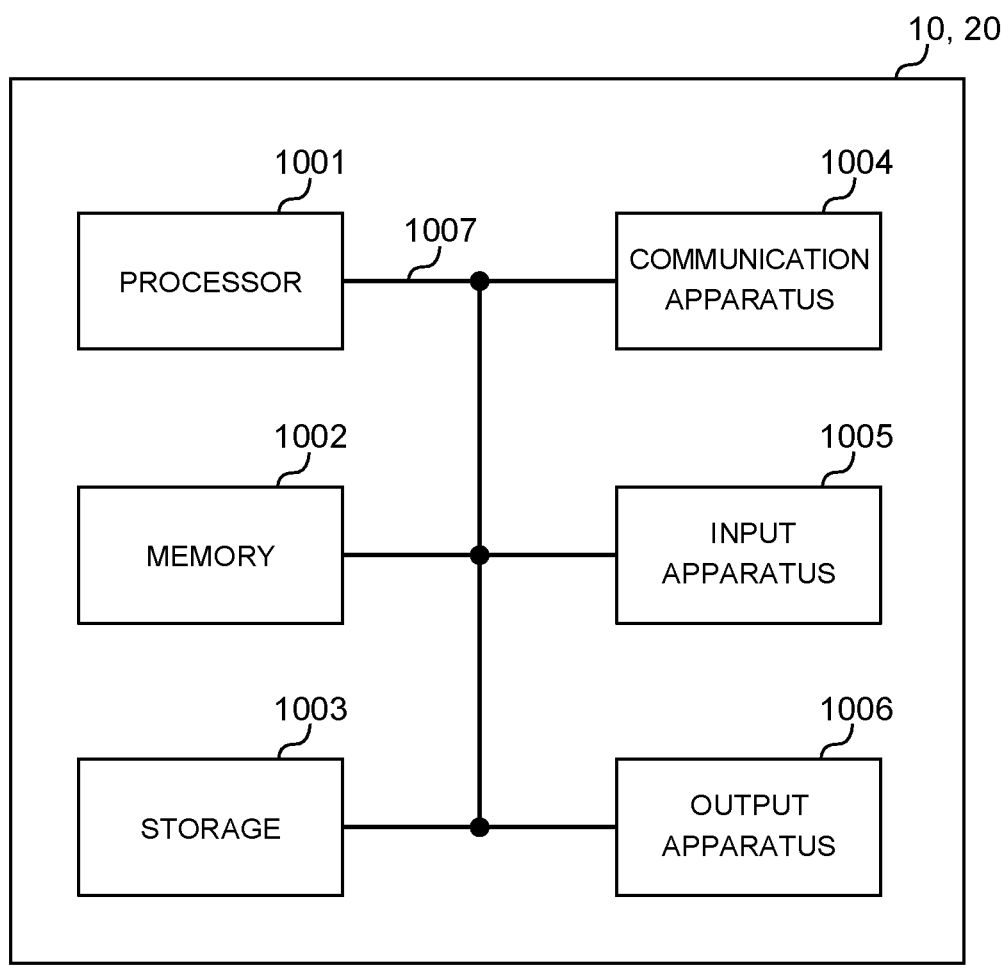
FIG. 20 is a diagram to show an exemplary hardware structure of a radio base station and a user terminal according to one embodiment of the present invention.

For example, the radio base station, user terminals and so on according to embodiments of the present invention may function as a computer that executes the processes of the radio communication method of the present invention. FIG. 20 is a diagram to show an example hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a number of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, registers and so on. For example, the above-described baseband signal processing section 104 (204), call processing section 105 and others may be implemented by the processor 1001.

Furthermore, the processor 1001 reads programs (program codes), software modules or data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented using at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) that does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a number of minislots. Each mini-slot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a number of consecutive subframes may be referred to as a "TTI," or one slot or minislot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI duration less than the TTI duration of a long TTI and not less than one ms.

A resource block (RB) is the unit of resource allocation in the time domain and the frequency domain, and may include one or a number of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a number of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to- Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by its higher nodes (upper nodes). In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), input-ting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access."

As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a processor that uses either
  a first uplink control channel format or
  a second uplink control channel format,
  to transmit uplink control information, based on a number of bits of the uplink control information and a type of the uplink control information; and
a transmitter that transmits the uplink control information in an uplink control channel,
wherein the first uplink control channel format is transmitted without a demodulation reference signal and with a sequence based on a cyclic shift that depends on the uplink control information,
when the first uplink control channel format is transmitted over two symbols, the cyclic shift hops between the two symbols, and
the second uplink control channel format is transmitted with the demodulation reference signal and without a sequence based on a cyclic shift that depends on the uplink control information.

2. The terminal according to claim 1, wherein the processor controls the transmission of the uplink control information, which includes Hybrid Automatic Repeat request-Acknowledge (HARQ-ACK) in 2 bits or less, by using the first uplink control channel format.

3. The terminal according to claim 1, wherein the processor controls the transmission of the uplink control information, which includes Channel State Information (CSI) and is in more than 2 bits, by using the second uplink control channel format.

4. The terminal according to claim 2, wherein the processor controls the transmission of the uplink control information, which includes the HARQ-ACK in 2 bits or less and includes a positive Scheduling Request (SR) or a negative SR, by using the first uplink control channel format.

5. The terminal according to 1, wherein when the uplink control information transmitted using the first uplink control channel format includes the HARQ-ACK in 2 bits, an interval of four cyclic shifts based on four values of the HARQ-ACK, respectively, is $\pi/2$.

6. A radio communication method for a terminal, comprising:
using either
a first uplink control channel format or
a second uplink control channel format,
to transmit uplink control information, based on a number of bits of the uplink control information and a type of the uplink control information; and
transmitting the uplink control information in an uplink control channel,
wherein the first uplink control channel format is transmitted without a demodulation reference signal and with a sequence based on a cyclic shift that depends on the uplink control information,
when the first uplink control channel format is transmitted over two symbols, the cyclic shift hops between the two symbols, and
the second uplink control channel format is transmitted with the demodulation reference signal and without a sequence based on a cyclic shift that depends on the uplink control information.

7. The terminal according to claim 2, wherein the processor controls the transmission of the uplink control information, which includes Channel State Information (CSI) and is in more than 2 bits, by using the second uplink control channel format.

8. The terminal according to claim 2, wherein when the uplink control information transmitted using the first uplink control channel format includes the HARQ-ACK in 2 bits, an interval of four cyclic shifts based on four values of the HARQ-ACK, respectively, is $\pi/2$.

9. The terminal according to claim 3, wherein when the uplink control information transmitted using the first uplink control channel format includes the HARQ-ACK in 2 bits, an interval of four cyclic shifts based on four values of the HARQ-ACK, respectively, is $\pi/2$.

10. The terminal according to claim 4, wherein when the uplink control information transmitted using the first uplink control channel format includes the HARQ-ACK in 2 bits, an interval of four cyclic shifts based on four values of the HARQ-ACK, respectively, is $\pi/2$.

11. A system comprising:
a terminal that comprises:
a processor that uses either a first uplink control channel format or a second uplink control channel format, for transmission of uplink control information, based on a number of bits of the uplink control information and a type of the uplink control information; and
a transmitter that transmits the uplink control information in an uplink control channel; and
a base station that receives the uplink control information,
wherein the first uplink control channel format is transmitted without a demodulation reference signal and with a sequence based on a cyclic shift that depends on the uplink control information,
when the first uplink control channel format is transmitted over two symbols, the cyclic shift hops between the two symbols, and
the second uplink control channel format is transmitted with the demodulation reference signal and without a sequence based on a cyclic shift that depends on the uplink control information.

* * * * *